(12) United States Patent
Xu

(10) Patent No.: US 11,863,714 B2
(45) Date of Patent: Jan. 2, 2024

(54) METHOD FOR CONSTRUCTING MOTION INFORMATION CANDIDATE LIST, METHOD AND APPARATUS FOR TRIANGLE PREDICTION DECODING

(71) Applicant: HANGZHOU HIKVISION DIGITAL TECHNOLOGY CO., LTD., Hangzhou (CN)

(72) Inventor: Liying Xu, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 349 days.

(21) Appl. No.: 17/471,531

(22) Filed: Sep. 10, 2021

(65) Prior Publication Data

US 2021/0409686 A1    Dec. 30, 2021

Related U.S. Application Data

(63) Continuation of application No. PCT/CN2020/078861, filed on Mar. 11, 2020.

(30) Foreign Application Priority Data

Mar. 11, 2019 (CN) .......................... 201910181861.7

(51) Int. Cl.
*H04N 19/139* (2014.01)
*H04N 19/159* (2014.01)
(Continued)

(52) U.S. Cl.
CPC ......... *H04N 19/105* (2014.11); *H04N 19/139* (2014.11); *H04N 19/159* (2014.11); *H04N 19/176* (2014.11); *H04N 19/196* (2014.11)

(58) Field of Classification Search
CPC .......................... H04N 19/105; H04N 19/139
See application file for complete search history.

(56) References Cited

U.S. PATENT DOCUMENTS 9,571,852 B2 *  2/2017  Lim ...................... H04N 19/13
10,091,523 B2   10/2018 Lin
(Continued)

FOREIGN PATENT DOCUMENTS

CN    102883163    1/2013
CN    102946536    2/2013
(Continued)

OTHER PUBLICATIONS

Chuang et al., "CE10-related: Simplification of triangle merging candidate list derivation (JVET-M0184-v1)" Joint Video Experts Team (JVET) of ITU-T SG 16 WP 3 and ISO/IEC JTC 1/SC 29/WG 11 13th Meeting: Marrakech, MA, Jan. 2019, 3 pages.

(Continued)

*Primary Examiner* — Irfan Habib
(74) *Attorney, Agent, or Firm* — Fish & Richardson P.C.

(57) ABSTRACT

The present disclosure provides a method for constructing a motion information candidate list, a method and an apparatus for triangle prediction decoding. The method includes: determining a checking order for each of spatial candidate blocks of a current image block; wherein the checking order for the spatial candidate block on top of the current image block is prior to the checking order for the spatial candidate block on the left of the current image block; determining spatial candidate motion information based on the checking order; and constructing a motion information candidate list corresponding to the current image block based on the spatial candidate motion information. The method can reduce coding consumption, and improve coding performance.

20 Claims, 9 Drawing Sheets

(51) Int. Cl.
  *H04N 19/176* (2014.01)
  *H04N 19/105* (2014.01)
  *H04N 19/196* (2014.01)

(56) References Cited

U.S. PATENT DOCUMENTS

| | | | | |
|---|---|---|---|---|
| 10,645,380 | B2* | 5/2020 | Xu | H04N 19/503 |
| 11,051,023 | B2* | 6/2021 | Lee | H04N 19/122 |
| 11,134,267 | B2* | 9/2021 | Zhang | H04N 19/52 |
| 11,146,785 | B2* | 10/2021 | Zhang | H04N 19/52 |
| 11,159,807 | B2* | 10/2021 | Zhang | H04N 19/176 |
| 11,159,817 | B2* | 10/2021 | Zhang | H04N 19/513 |
| 11,394,959 | B2* | 7/2022 | Lee | H04N 19/52 |
| 11,477,437 | B2* | 10/2022 | Zhang | H04N 19/52 |
| 2013/0195188 | A1* | 8/2013 | Sugio | H04N 19/147 375/240.14 |
| 2013/0243098 | A1 | 9/2013 | Lin et al. | |
| 2014/0301471 | A1* | 10/2014 | Lin | H04N 19/52 375/240.16 |
| 2015/0245048 | A1* | 8/2015 | Sugio | H04N 19/573 375/240.16 |
| 2015/0264386 | A1* | 9/2015 | Pang | H04N 19/463 375/240.16 |
| 2015/0341664 | A1* | 11/2015 | Zhang | H04N 19/147 375/240.12 |
| 2018/0343467 | A1 | 11/2018 | Lin | |
| 2018/0376160 | A1* | 12/2018 | Zhang | H04N 19/597 |
| 2021/0021858 | A1* | 1/2021 | Zheng | H04N 19/513 |
| 2021/0168355 | A1* | 6/2021 | Chen | H04N 19/70 |

FOREIGN PATENT DOCUMENTS

| | | | |
|---|---|---|---|
| CN | 103338372 | 10/2013 | |
| CN | 103385003 | 11/2013 | |
| CN | 103765886 | 4/2014 | |
| CN | 103841425 | 6/2014 | |
| CN | 104054350 | 9/2014 | |
| CN | 104363451 | 2/2015 | |
| CN | 104904219 | 9/2015 | |
| CN | 106851271 | 6/2017 | |
| CN | 107113446 | 8/2017 | |
| CN | 108353184 | 7/2018 | |
| CN | 108600767 | 9/2018 | |
| CN | 108683922 | 10/2018 | |
| CN | 108777789 | 11/2018 | |
| CN | 109413426 | 3/2019 | |
| CN | WO2019084776 | * 5/2019 | H04N 19/52 |
| CN | 110521206 | 11/2019 | |
| CN | 110662072 | 1/2020 | |
| CN | 110809161 | 2/2020 | |
| CN | 110933439 | 3/2020 | |
| EP | 2728882 | 5/2014 | |
| EP | 2755389 | 7/2014 | |
| EP | 3923582 | 12/2021 | |
| WO | 2015180014 | 12/2015 | |

OTHER PUBLICATIONS

CN Office Action issued in Chinese Appln. No. 2019101818617, dated Jan. 6, 2021, 23 pages (With English Translation).
CN Office Action issued in Chinese Appln. No. 2019101818617, dated Jun. 17, 2021, 21 pages (With English Translation).
CN Office Action issued in Chinese Appln. No. 2019111511639, dated Aug. 24, 2020, 15 pages (With English Translation).
Huang et al., "CE4. 1.6: Simplification of affine AMWP candidate list construction" Joint Video Experts Team(JVET) of ITU-T SG 16 WP 3 and ISO/IEC JTC 1/SC/WG 11 12th Meeting: Macao, CN, Oct. 2018 (Oct. 12, 2018), 4 pages.
Li et al., "CE4-ranking based spatial merge candiate list for inter prediction(Test CE4.4.14)" Joint Video Experts Team(JVET) of ITU-T SG 16 WP 3 and ISO/IEC JTC 1/SC 29/WG 11 12th Meeting: Macao, Oct. 2018, 4 pages.
PCT International Search Report in International Appln. No. PCT/CN2020/078861, dated Jun. 5, 2020, 8 pages (With English Translation).
PCT International Search Report in International Appln. No. PCT/CN2020/078868, dated May 27, 2020, 6 pages (With English Translation).
Xu et al., "Candidate list reordering (JVET-K0065-v4)" Joint Video Experts Team (JVET) of ITU-T SG 16 WP 3 and ISO/IEC JTC 1/SC 29/WG 11 11th Meeting: Ljubljana, SI, Jul. 2018, 7 pages.
Xu et al., "CE4: Candidate List Reordering (Test 4.4.13) (JVET-L0186-v2)" Joint Video Experts Team (JVET) of ITU-T SG 16 WP 3 and ISO/IEC JTC 1/SC 29/WG 11 12th Meeting. Macao, Oct. 2018, 8 pages.
Xu et al., "CE4-related: Simplification of candidate list derivation for MMVD mode" Joint Video Experts Team(JVET) of ITU-T SG 16 WP 3 and ISO/IEC JTC 1/SC 29/WG 11 13th Meeting. Marrakech, MA, Jan. 2019, 7 pages.
Chen et al., "Algorithm description for Versatile Video Coding and Test Model 4 (VTM 4)," Joint Video Experts Team (JVET) of ITU-T SG 16 WP 3 and ISO/IEC JTC I/SC 29/WG11, 13th Meeting: Marrakech, Morocco, Jan. 9-18, 2019, 62 pages.
CN Office Action issued in Chinese Application No. 201910181861.7 dated Nov. 30, 2021, 19 pages (with English translation).
EP Extended European Search Report issued in European Application No. 20770744.9 dated Mar. 1, 2022, 19 pages.
International Preliminary Report on Patentability issued in International Application No. PCT/CN2020/078861 dated Jun. 5, 2020, 15 pages.
International Preliminary Report on Patentability issued in International Application No. PCT/CN2020/078868 dated May 27, 2020, 13 pages.
Ma et al., "Enhanced Block Vector Predictor List Construction for Intra Block Copy," Joint Collaborative Team on Video Coding (JCT-VC) of ITU-T SG 16 WP 3 and ISO/IEC JTC 1/SC 29/WG 11, 19th Meeting: Strasbourg, France, Oct. 17-24, 2014, 4 pages.

* cited by examiner

METHOD FOR CONSTRUCTING MOTION INFORMATION CANDIDATE LIST, METHOD AND APPARATUS FOR TRIANGLE PREDICTION DECODING

CROSS-REFERENCE TO RELATED APPLICATIONS

This application is a continuation of International Application No. PCT/CN2020/078861 filed on Mar. 11, 2020, which claims priority to Chinese Patent Application No. 201910181861.7 filed on Mar. 11, 2019. The entire contents of the above referenced applications are incorporated herein by reference for all purposes.

TECHNICAL FIELD

The present disclosure relates to video coding and decoding technology, and more particularly, to a method for constructing a motion information candidate list, a method and an apparatus for triangle prediction decoding.

BACKGROUND

Inter prediction refers to predicting pixels of a current image from pixels of an adjacent coded/decoded image based on correlation in video temporal domain, so as to effectively remove redundancy in the video temporal domain.

At present, dominant video coding and decoding standards all adopt block-based motion compensation technology for inter prediction. The main idea is to find a best matching block in a previously coded/decoded image for each pixel block in the current image, and the process is referred to as Motion Estimation (ME for short). The image used for prediction is referred to as a reference frame, a displacement from a reference block to a current pixel block is referred to as a Motion Vector (MV for short), and a difference between the current pixel block and the reference block is referred to as a prediction residual.

Since motion information of neighboring blocks in spatial domain has a strong correlation, and the motion information also has a certain degree of correlation in the temporal domain, if the motion information of the neighboring blocks in the spatial or temporal domain is used for prediction of motion information of the current block to obtain predicted pixel values, only the residuals need to be coded and decoded, which can significantly reduce the number of bits to be coded and decoded for the motion information. A same motion information candidate list is constructed at both a coding side and a decoding side, and without directly coding and decoding the motion information, the motion information can be expressed only by coding and decoding a sequence number (for example, Merge_idx) finally selected in the candidate list, thereby significantly reducing the number of bits to be coded and decoded.

In order to make use of the spatial correlation and temporal correlation of neighboring blocks, current video coding and decoding standards have proposed Merge technology, Advanced Motion Vector Prediction (AMVP) Technology, Alternative Temporal Motion Vector Prediction (ATMVP) technology, Triangle prediction technology, Intra Block Copy (IBC) technology, and Affine technology for motion information prediction. They all use the idea of spatial motion information prediction, or spatial and temporal motion information prediction, by establishing a motion information candidate list, and selecting a best candidate from the list based on a preset rule as prediction information of a current unit.

However, it has been found in practice that in the motion information prediction scheme in the current video coding and decoding standards, when constructing a motion information candidate list, the index corresponding to the candidate motion information finally selected as the prediction information often is not the one with least number of bits. It may lead to a large overhead in coding and decoding indices, and lower the performance in video coding and decoding.

SUMMARY

In view of the above, the present disclosure provides a method for constructing a motion information candidate list, a method and an apparatus for triangle prediction decoding.

Specifically, the present disclosure is implemented through the following technical solutions.

According to a first aspect of examples of the present disclosure, a method for constructing a motion information candidate list is provided, including:
  determining a checking order for each of spatial candidate blocks of a current image block; wherein the checking order for the spatial candidate block on top of the current image block is prior to the checking order for the spatial candidate block on the left of the current image block;
  determining spatial candidate motion information based on the checking order; and
  constructing a motion information candidate list corresponding to the current image block based on the spatial candidate motion information.

According to a second aspect of examples of the present disclosure, a method for triangle prediction decoding is provided, including:
  obtaining partition information of triangle sub-blocks of a current image block;
  obtaining index values of motion information corresponding to the triangle sub-blocks of the current image block in a list;
  performing sub-block partitioning of the current image block based on the partition information;
  constructing a motion information candidate list of the current image block; wherein the motion information candidate list is constructed based on the method for constructing a motion information candidate list;
  obtaining motion information corresponding to the triangle sub-blocks of the image block from the motion information candidate list based on the index values; and
  performing motion compensation on the triangle sub-blocks of the current image block and intermediate boundary sub-blocks thereof based on the motion information corresponding to the triangle sub-blocks of the image block to obtain prediction motion information of the current image block.

According to a third aspect of examples of the present disclosure, a method for coding/decoding indices is provided, including:
  binarizing indices of modes of motion information candidates to obtain a binary code word sequence;
  determining a context model matching a shape of a current image block; and
  coding/decoding a first binary code word in the binary code word sequence based on the context model.

According to a fourth aspect of examples of the present disclosure, a method for coding/decoding indices is provided, including:

binarizing indices of modes of motion information candidates based on a shape of a current image block, to obtain a binary code word sequence;

determining a context model; and coding/decoding a first binary code word in the binary code word sequence based on the context model.

According to a fifth aspect of examples of the present disclosure, an apparatus for constructing a motion information candidate list is provided, including: a processor, a communication interface, a memory, and a communication bus, wherein the processor, the communication interface, and the memory communicate with each other via the communication bus; the memory stores a computer program, the processor is caused by the computer program to:

determine a checking order for each of spatial candidate blocks of a current image block; wherein the checking order for the spatial candidate block on top of the current image block is prior to the checking order for the spatial candidate block on the left of the current image block;

determine spatial candidate motion information based on the checking order; and construct a motion information candidate list corresponding to the current image block based on the spatial candidate motion information.

According to a sixth aspect of examples of the present disclosure, an apparatus for triangle prediction decoding is provided, including: a processor, a communication interface, a memory, and a communication bus, wherein the processor, the communication interface, and the memory communicate with each other via the communication bus; the memory stores a computer program, the processor is caused by the computer program to:

obtain partition information of triangle sub-blocks of current image block;

obtain index values of motion information corresponding to the triangle sub-blocks of the current image block in a list;

perform sub-block partitioning of the current image block based on the partition information;

construct a motion information candidate list of the current image block; wherein the motion information candidate list is constructed based on the method for constructing a motion information candidate list;

obtain motion information corresponding to the triangle sub-blocks of the image block from the motion information candidate list based on the index values; and perform motion compensation on the triangle sub-blocks of the current image block and intermediate boundary sub-blocks thereof based on the motion information corresponding to the triangle sub-blocks of the image block to obtain the prediction motion information of the current image block.

According to a seventh aspect of examples of the present disclosure, an apparatus for coding/decoding indices is provided, including: a processor, a communication interface, a memory, and a communication bus, wherein the processor, the communication interface, and the memory communicate with each other via the communication bus; the memory stores a computer program, the processor is caused by the computer program to:

binarize indices of modes of motion compensation candidates to obtain a binary code word sequence;

determine a context model matching a shape of a current image block; and code/decode a first binary code word in the binary code word sequence based on the context model.

According to an eighth aspect of examples of the present disclosure, an apparatus for coding/decoding indices is provided, including: a processor, a communication interface, a memory, and a communication bus, wherein the processor, the communication interface, and the memory communicate with each other via the communication bus; the memory stores a computer program, the processor is caused by the computer program to:

binarize indices of modes of motion information candidates based on a shape of a current image block, to obtain a binary code word sequence;

determine a context model; and code/decode a first binary code word in the binary code word sequence based on the context model.

In the method for constructing a motion information candidate list according to the examples of the present disclosure, by determining the checking order for the spatial candidate blocks of the current image block, and based on the determined checking order, the spatial candidate motion information is determined, and further, based on the spatial candidate motion information, motion information candidate list corresponding to the current image block can be constructed. By utilizing the characteristics that the probability of the motion information of the spatial candidate blocks on top of the current image block being finally selected is higher than the probability of the motion information of the spatial candidate blocks on the left of the current image block being finally selected, which can reduce overhead in coding indices, and improve the coding performance.

DETAILED DESCRIPTION OF THE EXAMPLES

Figure 1A:
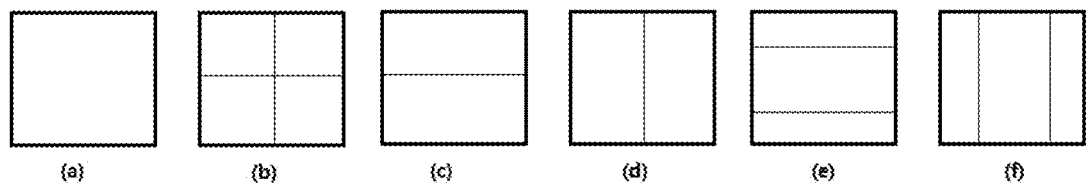
FIGS. 1A to 1B are schematic diagrams showing block partition according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context.

In order to enable those skilled in the art to better understand the technical solutions provided by the examples of the present disclosure, the block partition technology in the existing video coding standards will be first briefly described below.

In HEVC, one Coding Tree Unit (CTU) is recursively partitioned into Coding Units (CUs) using a quadtree. It is determined whether to perform intra coding or inter coding at a leaf node CU. The CU can be further partitioned into two or four Prediction Units (PUs), and the same prediction information is used in the same PU. After the prediction is completed and residual information is obtained, a CU can be further partitioned into a plurality of Transform Units (TUs) using a quadtree. For example, the current image block in the present disclosure is a PU.

Figure 1B:
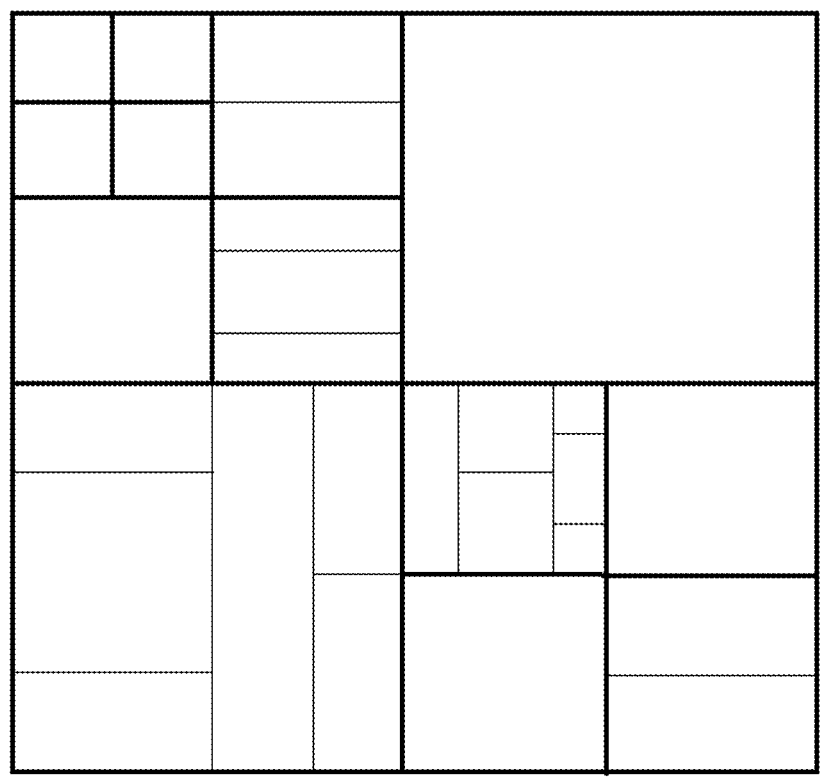

However, in newly proposed Versatile Video Coding (VVC), the block partition technology has undergone major changes. A partition structure with a mixture of binary tree/ternary tree/quadtree replaces an original partition mode, and the distinction between the concepts of CU, PU, and TU is eliminated, which can support a more flexible way of partitioning CU. The CU can adopt a square partition or a rectangle partition. The CTU is first partitioned using a quadtree, and then the leaf nodes obtained by the quadtree partition can be further partitioned using a binary tree and a ternary tree. As shown in FIG. 1A, there are five types of CU partitions, respectively quadtree partition, horizontal binary tree partition, vertical binary tree partition, horizontal ternary tree partition, and vertical ternary tree partition. As shown in FIG. 1B, CU partition within a CTU can be any combination of the above five partition types. It can be seen that different partition methods can result in different shapes of the PUs, such as rectangles and squares of different sizes.

The prediction mode in the present disclosure will be introduced as follows.

1. Merge Mode

H265/HEVC proposes merge technology (motion information prediction in a Merge mode) and AMVP technology (that is, motion information prediction in an AMVP mode) for motion information prediction. Both are based on ideas of spatial motion information prediction and temporal motion information prediction. By constructing a candidate motion information list, an optimal motion information candidate is selected as the prediction motion information of the current image block based on a rate-distortion cost.

In the Merge mode, the motion information of the current image block is directly predicted based on motion information of neighboring data blocks in the spatial or temporal domain, and there is no Motion Vector Difference (MVD). When the coding side and the decoding side construct a motion information candidate list in the same manner, it is enough for the coder to transmit only an index of prediction motion information in the motion information candidate list, which can significantly reduce the number of bits to be coded for the motion information.

2. AMVP Mode

Motion information prediction in the AMVP mode also uses the correlation between the motion information of neighboring data blocks in the spatial and temporal domains to construct a motion information candidate list for the current image block. The coder selects the optimal prediction motion information from the list, and performs differential coding on the selected prediction motion information. The decoder constructs the same motion information candidate list, and can calculate the motion information of the current image block with only the motion vector residual and the sequence number of the prediction motion information in the list. The length of the motion information candidate list in the AMVP mode is 2.

3. Affine Merge Mode

The Affine mode is a newly introduced inter prediction mode of H.266, which has a good prediction effect for rotating and zooming scenes.

There are two Affine modes in JEM, one is Affine Inter and the other is Affine Merge. For the Affine Merge method, the candidate image blocks are traversed to find the first candidate that is coded in the Affine mode. For the Affine Merge (AF_MERGE) method, there is no need to transmit some additional index values, and it is enough to just transmit a Flag indicating whether to use Affine Merge.

4. ATMVP Mode

The ATMVP technology is a sub-block based prediction technology, in which initial motion information is determined from spatial motion information to find the corresponding block in the reference frame; the corresponding block is partitioned into sub-blocks, and the motion information of each sub-block is mapped to be motion information of the current sub-block.

5. Triangle Prediction

The triangle prediction technology is used in VVC. In triangle prediction, a block is partitioned into two triangular sub-blocks. These two triangular sub-blocks have different unidirectional motion information. The triangle prediction mode is only used for Merge/Skip mode and is used in the prediction process, which does not affect the subsequent transformation and quantization process.

Figure 2:
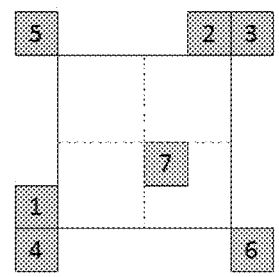
FIG. 2 is a schematic diagram showing a position of candidate information in a triangle prediction according to an example of the present disclosure.

A new motion information candidate list is designed for the triangle prediction mode. The motion information candidate list can include for example five pieces of unidirectional motion information. The candidate motion information can be obtained from motion information of spatial neighboring blocks at positions 1 to 5 shown in FIG. 2, and motion information of temporal neighboring blocks at positions 6 and 7. By collecting the usable motion information of these 7 positions, a unidirectional motion information list is constructed based on a certain rule.

In the triangle prediction mode, when the number of pieces of candidate motion information obtained is smaller than 5, the candidate list can be packed with zero motion information.

6. IBC Prediction

IBC prediction is a block copy technology that finds a corresponding block of the current block in the same frame, and uses the motion information of the corresponding block as the prediction information of the motion information of the current block. The IBC prediction supports IBC merge mode and IBC AMVP mode. Similar to the regular merge mode and AMVP mode, the IBC prediction also needs to use the motion information of the neighboring blocks in the spatial domain as candidate information.

In order to make the objectives, features, and advantages of the examples of the present disclosure more apparent and understandable, the technical solutions in the examples of the present disclosure will be further described in detail below with reference to the accompanying drawings.

It should be noted that the method for constructing a motion information candidate list described herein can be applied to a coding-side device, and can also be applied to a decoding-side device.

When applied to a coding-side device, the current image block described herein is a coding block, and a coded/decoded block refers to a coded block.

When applied to a decoding-side device, the current image block described herein is a decoding block, and a coded/decoded block refers to a decoded block, which will not be repeated herein.

Figure 3:
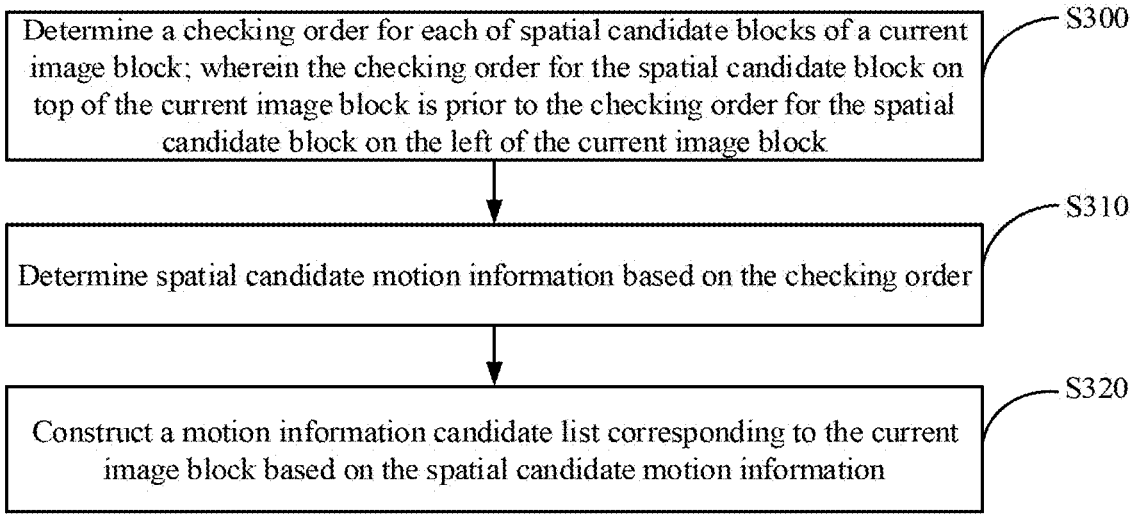
FIG. 3 is a schematic flowchart of a method for constructing a motion information candidate list according to an example of the present disclosure.

Referring to FIG. 3, FIG. 3 is a schematic flowchart of a method for constructing a motion information candidate list according to an example of the present disclosure. As shown in FIG. 3, the method for constructing a motion information candidate list can include the following steps.

At Step S300, a checking order for each of spatial candidate blocks of a current image block is determined; wherein the checking order for the spatial candidate block on top of the current image block is prior to the checking order for the spatial candidate block on the left of the current image block.

In the example of the present disclosure, it is considered that the order of the spatial motion information candidates in the motion information candidate list is related to the checking order for the spatial candidate blocks of the current image block when the motion information candidate list is constructed, and when the prediction motion information finally selected in the motion information candidate list is ranked higher among the motion information candidates, the number of bits for coding the index value of the finally-selected prediction motion information can be reduced, and the performance in video coding can be improved. In addition, when performing motion information prediction, if the prediction motion information finally selected in the motion information candidate list is ranked higher in the motion information candidate list, consumption for selecting prediction motion information can be reduced. That is, under the same consumption for coding indices, ranking the prediction motion information with high-relevance to be higher in the motion information list can improve the performance in video coding. Therefore, when constructing the motion information candidate list, the spatial candidate blocks with a higher probability of being selected for predicting motion information can be checked first.

Correspondingly, in this example of the present disclosure, when determining the checking order for the spatial candidate blocks of the current image block, a spatial candidate block on the top of the current image block can be checked prior to a spatial candidate block on the left of the current image block.

In an implementation of the present disclosure, determining the checking order for the spatial candidate blocks of the current image block can include:

determining a prediction mode for the current image block;

determining the checking order for the spatial candidate blocks of the current image block based on the prediction mode.

In this implementation, considering that in different prediction modes, the candidate motion information that is finally selected as the prediction motion information can be different. Therefore, in order to improve the rationality of the checking order for the determined spatial candidate blocks and improve the coding performance, the checking order for the spatial candidate blocks of the current image block can be determined in combination with the prediction mode for the current image block.

In an example of this implementation, determining the checking order for the spatial candidate blocks of the current image block based on the prediction mode can include:

when the prediction mode for the current image block is a merge mode, an IBC merge mode, an affine merge mode or a triangle prediction merge mode, the checking order for the spatial candidate blocks of the current image block includes at least a traversal order for 4 spatial candidate blocks; wherein the traversal order for the 4 spatial candidate blocks is prior to that for the fifth spatial candidate block, and the fifth spatial candidate block is a spare spatial candidate block.

As an example, the 4 spatial candidate blocks can include a first spatial candidate block, a second spatial candidate block, a third spatial candidate block, and a fourth spatial candidate block.

Taking FIG. 4 as an example, in the example of the present disclosure, the first spatial candidate block (hereinafter referred to as A1) is the lowermost spatial neighboring block on the left of the current image block; the second spatial candidate block (hereinafter referred to as B1) is the rightmost spatial neighboring block on top of the current image block; the third spatial candidate block (hereinafter referred to as B0) is the spatial neighboring block closest to the top-right corner of the current image block; the fourth spatial candidate block (hereinafter referred to as A0) is the spatial neighboring block closest to the bottom-left corner of the current image block; and the fifth spatial candidate block (hereinafter referred to as B2) is the spatial neighboring block closest to the top-left corner of the current image block.

As an example, the traversal order of the 4 spatial candidate blocks is a first traversal order, and the first traversal order is to sequentially traverse the second spatial candidate block, the first spatial candidate block, the fourth spatial candidate block and the third spatial candidate block (can be described as B1→A1→A0→B0).

That is, in this example, the traversal order of the spatial candidate blocks can be B1→A1→A0→B0→(B2), and B2 is a spare spatial candidate block.

As an example, the spare spatial candidate block can be checked when the motion information of at least one spatial candidate block is not usable.

In this example, considering that for the merge mode, the IBC merge mode, the affine merge mode, and the triangle prediction merge mode, there are at most 4 pieces of candidate motion information from the spatial domain. Therefore, when performing spatial candidate block check, at least 4 spatial candidate blocks can be traversed, and the fifth spatial candidate block is used as a spare spatial candidate block, and the spare spatial candidate block is checked when the motion information of at least one spatial candidate block is not usable.

Considering that in the merge mode, the IBC merge mode, the affine merge mode, and the triangle prediction merge mode, the probability of B1 being selected for predicting motion information is higher than the probability of A1 being selected for predicting motion information, and the probability of B2 being selected for predicting motion information is lower than the probability of the remaining 4 spatial candidate blocks being selected for predicting motion information. Therefore, when determining the checking order for the spatial candidate blocks, the checking order for B1 can be determined as prior to the checking order for A1, and B2 is determined as a spare spatial candidate block.

In another example of this implementation, determining the checking order for the spatial candidate blocks of the current image block based on the prediction mode can include:
  when the prediction mode for the current image block is a triangle prediction merge mode or an affine merge mode, the checking order for the spatial candidate blocks of the current image block may include a traversal order for 5 spatial candidate blocks;
  as an example, the 5 spatial candidate blocks include a first spatial candidate block, a second spatial candidate block, a third spatial candidate block, a fourth spatial candidate block, and a fifth spatial candidate block.

As an example, when the prediction mode for the current image block is triangle prediction merge mode, the traversal order for the 5 spatial candidate blocks is a second traversal order, and the second traversal order is to sequentially traverse the second spatial candidate block, the first spatial candidate block, the fourth spatial candidate block, the third spatial candidate block and the fifth spatial candidate block (can be described as B1→A1→A0→B0→B2).

As another example, when the prediction mode for the current image block is the affine merge mode, the traversal order for the 5 spatial candidate blocks is a third traversal order, and the third traversal order is to sequentially traverse the third spatial candidate block, the second spatial candidate block, the fifth spatial candidate block, the fourth spatial candidate block, and the first spatial candidate block (can be described as B0→B1→B2→A0→A1).

Figure 4:
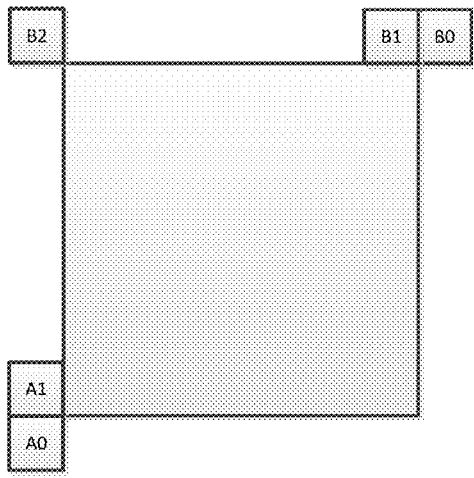
FIG. 4 is a schematic diagram showing positional relationship between each spatial candidate block and a current data block according to an example of the present disclosure.

In another example of this implementation, determining the checking order for the spatial candidate blocks of the current image block based on the prediction mode can include:
  when the prediction mode for the current image block is an ATMVP merge mode, the checking order for the spatial candidate blocks of the current image block includes a traversal order for 1 spatial candidate block.
  as an example, the 1 spatial candidate block includes a second spatial candidate block, such as B1 in FIG. 4.

In this example, considering that ATMVP is a sub-block based prediction technology, and when performing prediction coding, it only needs to refer to the motion information of the first usable spatial candidate block found when searching for spatial candidate motion information. Therefore, in order to improve the coding performance of the ATMVP merge mode, when searching for spatial candidate motion information, it is possible to only check the spatial candidate block B1.

In another example of this implementation, determining the checking order for the spatial candidate blocks of the current image block based on the prediction mode can include:
  when the prediction mode for the current image block is a merge mode, the checking order for the spatial candidate blocks of the current image block includes a traversal order for 4 spatial candidate blocks; or
  when the prediction mode for the current image block is an IBC merge mode, the checking order for the spatial candidate blocks of the current image block includes a traversal order for 4 spatial candidate blocks; or
  when the prediction mode for the current image block is a triangle prediction merge mode, the checking order for the spatial candidate blocks of the current image block includes a traversal order for 4 spatial candidate blocks; or
  when the prediction mode for the current image block is an affine merge mode, the checking order for the spatial candidate blocks of the current image block includes a traversal order for 4 spatial candidate blocks;
  as an example, the 4 spatial candidate blocks include a first spatial candidate block, a second spatial candidate block, a third spatial candidate block, and a fourth spatial candidate block.

In this example, considering that in the merge mode, the IBC merge mode, the triangle prediction merge mode, and the affine merge mode, the probability of B2 being selected for predicting motion information is lower than the probability of the remaining 4 spatial candidate blocks being selected for predicting motion information. Therefore, in order to improve coding performance, when determining spatial candidate motion information, it is possible to only check 4 spatial candidate blocks B0, B1, A0, and A1.

As an example, when the prediction mode for the current image block is the merge mode, the traversal order for the 4 spatial candidate blocks is a first traversal order; or
  when the prediction mode for the current image block is an IBC merge mode, the traversal order for the 4 spatial candidate blocks is a first traversal order; or
  when the prediction mode for the current image block is a triangle prediction merge mode, the traversal order for the 4 spatial candidate blocks is a first traversal order; or
  when the prediction mode for the current image block is an affine merge mode, the traversal order for the 4 spatial candidate blocks is a fourth traversal order, and the fourth traversal order is to sequentially traverse the third spatial candidate block, the second spatial candidate block, the fourth spatial candidate block and the first spatial candidate block.

In this example, considering that in the merge mode, the IBC merge mode, the triangle prediction merge mode, and the affine mode, the probability of B1 being selected for predicting motion information is higher than the probability of A1 being selected for predicting motion information. Therefore, in order to reduce coding consumption and improve coding performance, when determining spatial candidate motion information, the checking order for B1 can be determined to be prior to the checking order for A1.

In another example of this implementation, determining the checking order for the spatial candidate blocks of the current image block based on the prediction mode can include:

when the prediction mode for the current image block is an AMVP mode, an IBC AMVP mode or an affine AMVP mode, the checking order for the spatial candidate blocks of the current image block includes at least a fifth traversal order and a sixth traversal order; wherein the fifth traversal order is to traverse the spatial candidate blocks on top of the current image block; the sixth traversal order is to traverse the spatial candidate blocks on the left of the current image block; the spatial candidate blocks on the top include: the third spatial candidate block, the second spatial candidate block, and the fifth spatial candidate block; and the spatial candidate blocks on the left include: the fourth spatial candidate block and the first spatial candidate block;

the fifth traversal order is to sequentially traverse the third spatial candidate block, the second spatial candidate block, and the fifth spatial candidate block;

the sixth traversal order is to sequentially traverse the fourth spatial candidate block and the first spatial candidate block.

As an example, when the prediction mode for the current image block is an AMVP mode or an IBC AMVP mode, the checking order for the spatial candidate blocks of the current image block can be first sequentially traversing the spatial candidate blocks on the top based on the fifth traversal order, then traversing the spatial candidate blocks on the left based on the sixth traversal order.

In this example, considering that for the AMVP mode, the IBC AMVP mode, and the affine AMVP mode, the probability of the spatial candidate blocks on top of the current image block being finally selected for predicting motion information is higher than the probability of the spatial candidate blocks on the left being finally selected for predicting motion information. Therefore, when determining the checking order for spatial candidate blocks, the spatial candidate blocks on top of the current image block can be first traversed, and then the spatial candidate blocks on the left of the current image block can be traversed.

It should be noted that for the affine AMVP mode, when traversing the motion information of the spatial candidate block, it is necessary to check whether the spatial candidate block is an affine block, and whether there is affine motion information stored, if it is an affine block and there is stored affine motion information, it is determined that the motion information of the spatial candidate block is usable; otherwise, it is determined that the motion information of the spatial candidate block is unusable.

At Step S310, spatial candidate motion information is determined based on the checking order for the spatial candidate blocks of the current image block.

At Step S320, a motion information candidate list corresponding to the current image block is constructed based on the determined spatial candidate motion information.

In the example of the present disclosure, when the checking order for the spatial candidate blocks of the current image block is determined, the spatial candidate blocks of the current image block can be checked based on the determined checking order to determine the spatial candidate motion information; and based on the determined spatial domain candidate motion information, a motion information candidate list corresponding to the current image block can be constructed.

In an implementation of the present disclosure, constructing a motion information candidate list corresponding to the current image block based on the determined spatial candidate motion information can include:

when the prediction mode for the current image block is the merge mode, constructing the motion information candidate list corresponding to the current image block based on the determined spatial candidate motion information, temporal candidate motion information, and motion information of coded/decoded blocks prior to the current image block.

In this implementation, in order to increase the variety of candidate samples and improve the flexibility of motion information candidate selection, for the merge mode, when constructing the motion information candidate list, motion information of coded/decoded blocks prior to the current image block can be taken into consideration.

In this implementation, when the spatial candidate motion information and the temporal candidate motion information are determined, and the determined spatial candidate motion information and temporal domain candidate motion information are added to the motion information candidate list, if the number of pieces of candidate motion information in the candidate list is insufficient, candidate motion information can be determined from the motion information of coded/decoded blocks prior to the current image block.

As an example, the motion information of the coded/decoded blocks prior to the current image block can be stored in a global list (which can be referred to as the motion information list of coded/decoded blocks). The motion information list of coded/decoded blocks has a constant length, and the motion information of the coded/decoded blocks in the motion information list of coded/decoded blocks is updated based on a first-in first-out rule.

In this example, after the spatial candidate motion information and the temporal candidate motion information are added to the motion information candidate list, if the number of pieces of candidate motion information in the motion information candidate list is insufficient, candidate motion information can be selected from the motion information list of coded/decoded blocks.

As an example of this implementation, constructing a motion information candidate list corresponding to the current image block based on the determined spatial candidate motion information can also include:

when the prediction mode for the current image block is the merge mode, weighting pieces of motion information existing in the motion information candidate list;

adding motion information obtained by the weighting to the motion information candidate list of the current image block as candidate motion information.

In this example, in order to increase the variety of candidate samples and improve the flexibility of motion information candidate selection, for the merge mode, when constructing the motion information candidate list, the pieces of motion information existing in the list can be weighted to obtain new candidate motion information.

It should be noted that this example applies when the number of pieces of motion information existing in the motion information candidate list is larger than one, for example, weighting the top two pieces of motion information existing in the motion information candidate list.

In this example, if there is bi-directional motion information, the weighting needs to be performed for each of the forward motion information and the backward motion information of the bi-directional motion information.

For example, suppose that candidate motion information 1 and candidate motion information 2 are both bi-directional motion information, forward motion information of the candidate motion information 1 is forward motion information 11 and backward motion information of the candidate motion information 1 is backward motion information 12, and forward motion information of the candidate motion information 2 is forward motion information 21 and backward motion information of the candidate motion information 2 is backward motion information 22. Then, forward motion information resulted from weighting the forward motion information 11 and the forward motion information 21 is used as forward motion information resulted from weighting the candidate motion information 1 and the candidate motion information 2; and backward motion information resulted from weighting the backward motion information 12 and the forward motion information 22 is used as backward motion information resulted from weighting the candidate motion information 1 and the candidate motion information 2.

For another example, suppose that the candidate motion information 1 is bi-directional motion information, the candidate motion information 2 is unidirectional motion information, the candidate motion information 1 has forward motion information 11 and backward motion information 12, and reference frames of the candidate motion information 2 and the forward motion information 11 belong to the same reference list (such as List0). Then, forward motion information resulted from weighting the forward motion information 11 and the candidate motion information 2 is used as forward motion information resulted from weighting the candidate motion information 1 and the candidate motion information 2, and the backward motion information 12 is used as backward motion information resulted from weighting the candidate motion information 1 and the candidate motion information 2.

In an example of the present disclosure, the number of pieces of candidate motion information obtained by the weighting in the motion information candidate list should not exceed a preset number threshold (which can be set based on the actual scene, such as 1).

In another implementation of the present disclosure, constructing the motion information candidate list corresponding to the current image block based on the determined spatial candidate motion information can include:

when the prediction mode for the current image block is the IBC merge mode, constructing the motion information candidate list corresponding to the current image block based on the spatial candidate motion information and motion information of coded/decoded blocks prior to the current image block.

In this implementation, in order to increase the variety of candidate samples and improve the flexibility of motion information candidate selection, for the IBC merge mode, when constructing the motion information candidate list, the motion information of the coded/decoded blocks prior to the current image block can be considered.

In this implementation, after the spatial candidate motion information is determined and the determined spatial candidate motion information is added to the motion information candidate list, if the number of pieces of candidate motion information in the motion information candidate list is insufficient, candidate motion information can be determined from the motion information of the coded/decoded blocks prior to the current image block.

As an example, the motion information of the coded/decoded blocks prior to the current image block can be stored in a global list (which can be referred to as the motion information list of coded/decoded blocks). The motion information list of coded/decoded blocks has a constant length, and the motion information of the coded/decoded blocks in the motion information list of coded/decoded blocks is updated based on a first-in first-out rule.

In this example, after the spatial candidate motion information is added to the motion information candidate list, if the number of pieces of candidate motion information in the motion information candidate list is insufficient, candidate motion information can be selected from the motion information list of coded/decoded blocks.

As an example of this implementation, constructing a motion information candidate list corresponding to the current image block based on the determined spatial candidate motion information can also include:

when the prediction mode for the current image block is the IBC merge mode, weighting the pieces of the motion information existing in the motion information candidate list;

adding motion information obtained by the weighting to the motion information candidate list of the current image block as candidate motion information.

In this example, in order to increase the variety of candidate samples and improve the flexibility of motion information candidate selection, for the IBC merge mode, when constructing the motion information candidate list, the pieces of motion information existing in the list can be weighted to obtain new candidate motion information.

It should be noted that this example applies when the number of pieces of motion information existing in the motion information candidate list is larger than one, for example, weighting the top two pieces of motion information existing in the motion information candidate list.

In this example, if there is bi-directional motion information, it is necessary to perform weighting respectively for the forward motion information and the backward motion information of the bi-directional motion information.

In yet another implementation of the present disclosure, constructing a motion information candidate list corresponding to the current image block based on the determined spatial candidate motion information can include:

when the prediction mode for the current image block is the triangle prediction merge mode, constructing the motion information candidate list corresponding to the current image block based on the spatial candidate motion information and the temporal candidate motion information;

as an example, if the candidate motion information is bi-directional motion information, the forward motion information or/and the backward motion information of the bi-directional motion information is added to the motion information candidate list.

In this implementation, considering that triangle prediction can only use unidirectional motion information, after adding spatial candidate motion information and temporal candidate motion information to the motion information candidate list of the triangle prediction merge mode, it is necessary to check whether there is bi-directional motion information in the motion information candidate list, if so, forward motion information or/and backward motion information of the bi-directional motion information can be added to the motion information candidate list to replace the bi-directional motion information.

In another implementation of the present disclosure, constructing a motion information candidate list corresponding to the current image block based on the determined spatial candidate motion information can include:

when the prediction mode for the current image block is the triangle prediction merge mode, constructing the motion information candidate list corresponding to the current image block based on the spatial candidate motion information, the temporal candidate motion information, and the motion information of the coded/decoded blocks prior to the current image block;

As an example, if the candidate motion information is bi-directional motion information, the forward motion information or/and the backward motion information of the bi-directional motion information is added to the motion information candidate list.

In this implementation, in order to increase the variety of candidate samples and improve the flexibility of motion information candidate selection, for the triangle prediction merging mode, when constructing the motion information candidate list, the motion information of the coded/decoded blocks prior to the current image block can be considered.

As an example of this implementation, constructing a motion information candidate list corresponding to the current image block based on the determined spatial candidate motion information can also include:

when the prediction mode for the current image block is the triangle prediction merge mode, obtaining top two pieces of candidate motion information in the motion information candidate list;

adding weighted candidate motion information obtained by weighting the top two pieces of candidate motion information to the motion information candidate list.

In this example, in order to increase the variety of candidate samples and improve the flexibility of motion information candidate selection, for the triangle prediction merging mode, when constructing the motion information candidate list, the pieces of motion information existing in the list can be weighted to obtain new candidate motion information.

It should be noted that this example applies when the number of pieces of motion information existing in the motion information candidate list is larger than one, for example, weighting the top two pieces of motion information existing in the motion information candidate list.

As an example, for the triangle prediction merge mode, the pieces of candidate motion information in the motion information candidate list can be sorted in an order of the unidirectional motion information, the forward motion information of the bi-directional motion information, and the backward motion information of the bi-directional motion information, and average-weighted candidate motion information.

In another implementation of the present disclosure, constructing a motion information candidate list corresponding to the current image block based on the determined spatial candidate motion information can include:

when the prediction mode for the current image block is the affine merge mode, performing mapping and calculation on the determined spatial candidate motion information to obtain a first type candidate motion information, and adding the first type candidate motion information to the motion information candidate list;

performing mapping and calculation on a combination of two or three pieces of the motion information in the top-left corner, the motion information in the top-right corner, the motion information in the bottom-left corner of the current image block, and the temporal domain motion information, to obtain a second type candidate motion information, and adding the second type candidate motion information to the motion information candidate list.

In this example, for the affine merge mode, after the spatial candidate motion information is determined, corresponding candidate motion information (referred to as first type candidate motion information herein) can be calculated and mapped from the determined spatial candidate motion information, and the first type candidate motion information can be added to the motion information candidate list.

If the number of pieces of candidate motion information in the motion information candidate list is insufficient at this time, mapping and calculation can be performed on a combination of two or three pieces of the motion information in the top-left corner, the motion information in the top-right corner, the motion information in the bottom-left corner of the current image block, and the temporal domain motion information, so as to obtain corresponding candidate motion information (referred to as second type candidate motion information herein), and the second type candidate motion information can be added to the motion information candidate list.

Figure 5A:
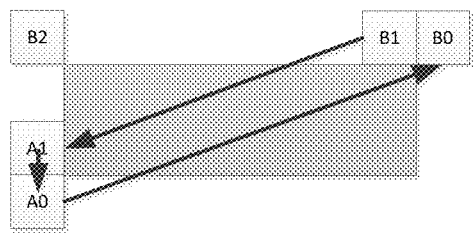
FIG. 5A is a schematic diagram showing a checking order for spatial candidate blocks according to an example of the present disclosure.
Figure 5B:
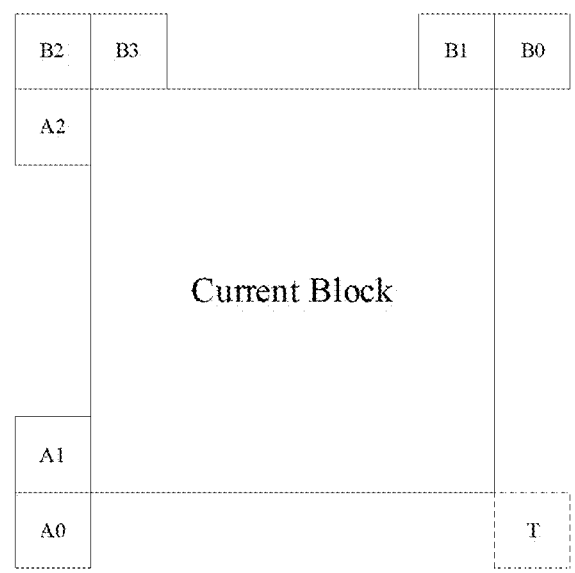
FIG. 5B is a schematic diagram of neighboring blocks in an affine mode according to an example of the present disclosure.

For example, as shown in FIG. 5B, the first piece of usable motion information obtained can be determined as the motion information in the top-left corner of the current image block by traversing the motion information of positions A2, B2, and B3 in a certain order. Similarly, the first piece of usable motion information obtained can be determined as the motion information in the top-right corner of the current image block by traversing the motion information of positions B1 and B0 in a certain order. The first piece of usable motion information obtained can be determined as the motion information in the bottom-left corner of the current image block by traversing the motion information of positions A0 and A1 in a certain order. The temporal motion information can be the temporal motion information of the position T.

In another implementation of the present disclosure, constructing a motion information candidate list corresponding to the current image block based on the determined spatial candidate motion information can include:

constructing a sub-block technology based motion information candidate list based on the candidate motion information of the ATMVP merge mode and the candidate motion information of the affine merge mode, and marking the mode of each piece of candidate motion information.

In this example, considering that the ATMVP merge mode and the affine merge mode are both sub-block based prediction technologies, therefore, for the ATMVP merge mode and the affine merge mode, the same sub-block technology based motion information candidate list can be constructed, and the mode (the ATMVP merge mode or the affine merge mode) of each piece of candidate motion information in the list is marked.

For example, the candidate motion information of the ATMVP merge mode can be used as the first piece of candidate motion information in the sub-block technology based motion information candidate list, and the subsequent candidate motion information is the candidate motion information of the affine merge mode.

As an example, constructing a sub-block technology based motion information candidate list based on the candidate motion information of the ATMVP merge mode and the candidate motion information of the affine merge mode can include:

constructing a sub-block technology based motion information candidate list based on candidate motion information of the ATMVP merge mode;

adding the candidate motion information of the affine merge mode to the sub-block technology based motion information candidate list.

In this example, a motion information candidate list based on the candidate motion information of the ATVMP merge mode can be constructed first, and then the candidate motion information based on the affine merge mode can be added into the list.

It should be noted that in the examples of the present disclosure, for various modes (including the merge mode, the triangle prediction merge mode, the IBC merge mode, the affine merge mode, the AMVP mode, the IBC AMVP mode, and the affine AMVP mode), when constructing the motion information candidate list, duplicate checking is required to be performed when adding candidate motion information to the constructed motion information candidate list, so as to avoid duplicate candidate motion information in the motion information candidate list.

It should also be noted that, in the example of the present disclosure, when the decoding side device decodes the code stream, after the decoding side device obtains the index of the optimal motion information carried in the code stream, in constructing the motion information candidate list, once the candidate motion information corresponding to the index can be determined, the constructing of the motion information candidate list can be ceased, and it is not necessary to construct a complete motion information candidate list.

In order to enable those skilled in the art to better understand the technical solutions provided by the examples of the present disclosure, constructing a motion information candidate list in the examples of the present disclosure will be described below with reference to specific examples.

EXAMPLE ONE

In this example, an example of constructing a motion information candidate list in the merge mode is given below.

In this example, for the merge mode, the checking order for the spatial candidate blocks of the current image block is adjusted to B1→A1→A0→B0→(B2); where the checking order for the first 4 spatial candidate blocks can be as shown in FIG. 5A; or the checking order for the spatial candidate blocks of the current image block is adjusted to B1→A1→A0→B0; or the checking order for the spatial candidate blocks of the current image block is adjusted to A1→B1→B0→A0.

Figure 5C:
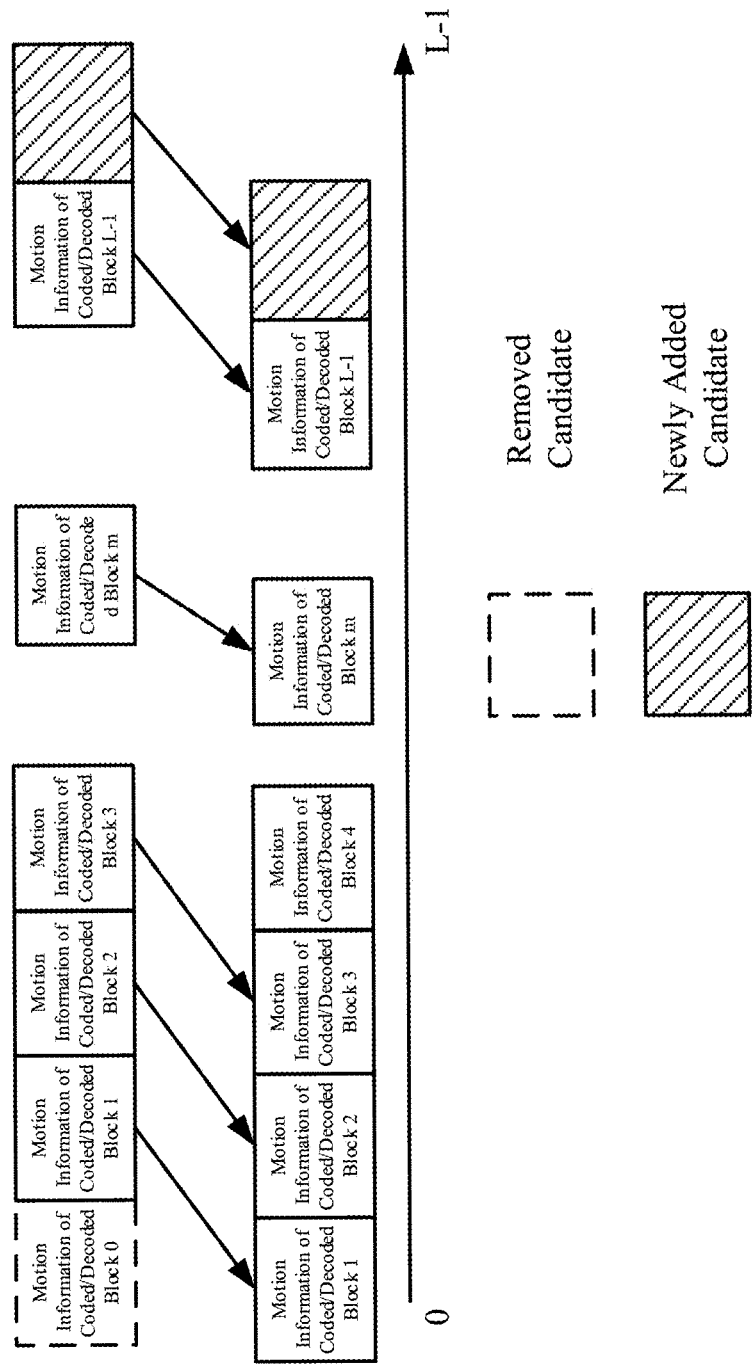
FIG. 5C is a schematic diagram of updating a coded/decoded motion information list according to an example of the present disclosure.

In this example, the specific implementation of constructing a motion information candidate list is as follows:

1. Checking the spatial candidate blocks of the current image block in the order of B1→A1→A0→B0→(B2) to determine the spatial candidate motion information, and adding the determined spatial candidate motion information to the motion information candidate list;

as an example, when the motion information of the top 4 spatial candidate blocks are not all usable (that is, at least one is not usable), B2 is checked;

or checking the spatial candidate blocks of the current image block in the order of B1→A→A0→B0 to determine the spatial candidate motion information, and adding the determined spatial candidate motion information to the motion information candidate list;

or checking the spatial candidate blocks of the current image block in the order of A1→B1→B0→A0 to determine the spatial candidate motion information, and adding the determined spatial candidate motion information to the motion information candidate list;

2. Determining the temporal candidate motion information, and adding the determined temporal candidate motion information to the motion information candidate list;

3. If the number of pieces of candidate motion information in the motion information candidate list is insufficient, constructing a motion information list of coded/decoded blocks based on the motion information of the coded/decoded blocks, and adding the motion information in the motion information list of coded/decoded blocks to the motion information candidate list as candidate motion information;

as an example, the motion information list of coded/decoded blocks has a constant length, and the motion information of the coded/decoded blocks in the motion information list is updated based on the first-in-first-out rule. The schematic diagram can be as shown in FIG. 5C;

4. If the number of pieces of candidate motion information in the motion information candidate list is still insufficient, determining new candidate motion information by weighting the pieces of candidate motion information existing in the motion information candidate list, and adding the determined new candidate motion information to the motion information candidate list;

As an example, when the number of pieces of candidate motion information existing in the motion information candidate list is larger than one, the weighting of the pieces of candidate motion information is performed.

If there is bi-directional motion information, it is necessary to perform weighting respectively for the forward motion information and the backward motion information of the bi-directional motion information, so as to obtain candidates for the bi-directional motion information.

For example, candidate motion information 1 and candidate motion information 2 are both bi-directional motion information, the candidate motion information 1 has forward motion information 11 and backward motion information 12, and the candidate motion information 2 has forward motion information 21 and backward motion information 22. Then, forward motion information resulted from weighting the forward motion information 11 and the forward motion information 21 is used as forward motion information resulted from weighting the candidate motion information 1 and the candidate motion information 2, and backward motion information resulted from weighting the backward motion information 12 and the backward motion information 22 is used as backward motion information resulted from weighting the candidate motion information 1 and the candidate motion information 2.

5. If the number of pieces of candidate motion information in the motion information candidate list is still insufficient, filling the list with default motion information (zero motion information).

EXAMPLE TWO

In this example, an example of constructing a motion information candidate list in the IBC merge mode is given below.

In this example, for the IBC merge mode, the checking order for the spatial candidate blocks of the current image block is adjusted to B1→A1→A0→B0→(B2); or the checking order for the spatial candidate blocks of the current image block is adjusted to B1→A1→A0→B0; or the checking order for the spatial candidate blocks of the current image block is adjusted to A1→B1→B0→A0.

In this example, the specific implementation of constructing a motion information candidate list is as follows:
1. Checking the spatial candidate blocks of the current image block in the order of B1→A1→A0→B0→(B2) to determine the spatial candidate motion information, and adding the determined spatial candidate motion information to the motion information candidate list;
as an example, when the motion information of the top 4 spatial candidate blocks are not all usable (that is, at least one is not usable), B2 is checked;
or checking the spatial candidate blocks of the current image block in the order of B1→A→A0→B0 to determine the spatial candidate motion information, and adding the determined spatial candidate motion information to the motion information candidate list;
or checking the spatial candidate blocks of the current image block in the order of A1→B1→B0→A0 to determine the spatial candidate motion information, and adding the determined spatial candidate motion information to the motion information candidate list;
2. If the number of pieces of candidate motion information in the motion information candidate list is insufficient, constructing a motion information list of coded/decoded blocks based on the motion information of the coded/decoded blocks, and adding the motion information in the motion information list of coded/decoded blocks to the motion information candidate list as candidate motion information;
as an example, the motion information list of coded/decoded blocks has a constant length, and the motion information of the coded/decoded blocks in the motion information list is updated based on the first-in-first-out rule;
3. If the number of pieces of candidate motion information in the motion information candidate list is still insufficient, determining new candidate motion information by weighting the pieces of candidate motion information existing in the motion information candidate list, and adding the determined new candidate motion information to the motion information candidate list;
as an example, when the number of pieces of candidate motion information existing in the motion information candidate list is larger than one, the weighting of the pieces of candidate motion information is performed.
4. If the number of pieces of candidate motion information in the motion information candidate list is still insufficient, filling the list with default motion information. The default motion information can be obtained by scaling offset of the motion information existing in the list or by scaling offset of zero motion information.

EXAMPLE THREE

In this example, an example of constructing a motion information candidate list in the IBC merge mode is given below.

In this example, for the IBC merge mode, the checking order for the spatial candidate blocks of the current image block is adjusted to B1→A1→A0→B0→(B2); or the checking order for the spatial candidate blocks of the current image block is adjusted to B1→A1→A0→B0; or the checking order for the spatial candidate blocks of the current image block is adjusted to A1→B1→B0→A0.

In this example, the specific implementation of constructing a motion information candidate list is as follows:
1. Checking the spatial candidate blocks of the current image block in the order of B1→A1→A0→B0→(B2) to determine the spatial candidate motion information, and adding the determined spatial candidate motion information to the motion information candidate list;
as an example, when the motion information of the top 4 spatial candidate blocks are not all usable (that is, at least one is not usable), B2 is checked;
or checking the spatial candidate blocks of the current image block in the order of B1→A1→A0→B0 to determine the spatial candidate motion information, and adding the determined spatial candidate motion information to the motion information candidate list;
or checking the spatial candidate blocks of the current image block in the order of A1→B1→B0→A0 to determine the spatial candidate motion information, and adding the determined spatial candidate motion information to the motion information candidate list;
2. If the number of pieces of candidate motion information in the motion information candidate list is insufficient, constructing a motion information list of coded/decoded blocks based on the motion information of the coded/decoded blocks, and adding the motion information in the motion information list of coded/decoded blocks to the motion information candidate list as candidate motion information;
as an example, the motion information list of coded/decoded blocks has a constant length, and the motion information of the coded/decoded blocks in the motion information list is updated based on the first-in-first-out rule;
3. If the number of pieces of candidate motion information in the motion information candidate list is still insufficient, filling the list with default motion information. The default motion information can be obtained by scaling offset of the motion information existing in the list or by scaling offset of zero motion information.

EXAMPLE FOUR

In this example, an example of constructing a motion information candidate list in the triangle prediction merge mode is given below.

In this example, for the triangle prediction merging mode, the checking order for the spatial candidate blocks of the current image block is adjusted to B1→A1→A0→B0→B2; or the checking order for the spatial candidate blocks of the current image block is adjusted to B1→A1→A0→B0→

(B2); or the checking order for the spatial candidate blocks of the current image block is adjusted to B1→A1→A0→B0; or the checking order for the spatial candidate blocks of the current image block is adjusted to A1→B1→B0→A0.

In this example, the specific implementation of constructing a motion information candidate list is as follows:
1. Checking the spatial candidate blocks of the current image block in the order of B1→A1→A0→B0→B2 to determine the spatial candidate motion information, and adding the determined spatial candidate motion information to the motion information candidate list;
   or checking the spatial candidate blocks of the current image block in the order of B1→A1→A0→B0→(B2) to determine the spatial candidate motion information, and adding the determined spatial candidate motion information to the motion information candidate list;
   as an example, when the motion information of the top 4 spatial candidate blocks are not all usable (that is, at least one is not usable), B2 is checked;
   or checking the spatial candidate blocks of the current image block in the order of B1→A1→A0→B0 to determine the spatial candidate motion information, and adding the determined spatial candidate motion information to the motion information candidate list;
   or checking the spatial candidate blocks of the current image block in the order of A1→B1→B0→A0 to determine the spatial candidate motion information, and adding the determined spatial candidate motion information to the motion information candidate list;
2. Determining the temporal candidate motion information, and adding the determined temporal candidate motion information to the motion information candidate list;
3. If there is bi-directional motion information in the motion information candidate list, replacing the bi-directional motion information with forward motion information or/and backward motion information of the bi-directional motion information;
4. If the number of pieces of candidate motion information in the motion information candidate list is insufficient, obtaining the top two pieces of candidate motion information (if any) in the motion information candidate list, and adding motion information obtained by weighting the top two pieces of candidate motion information to the motion information candidate list;
   as an example, the pieces of candidate motion information in the motion information candidate list are sorted in an order of the unidirectional motion information, the forward motion information of the bi-directional motion information, and the backward motion information of the bi-directional motion information, and the motion information obtained by the weighting;
5. If the number of pieces of candidate motion information in the motion information candidate list is still insufficient, filling the list with default motion information (zero motion information).

EXAMPLE FIVE

In this example, an example of constructing a motion information candidate list in the triangle prediction merge mode is given below.

In this example, for the triangle prediction merging mode, the checking order for the spatial candidate blocks of the current image block is adjusted to B1→A1→A0→B0→B2; or the checking order for the spatial candidate blocks of the current image block is adjusted to B1→A1→A0→B0→ (B2); or the checking order for the spatial candidate blocks of the current image block is adjusted to B1→A1→A0→B0; or the checking order for the spatial candidate blocks of the current image block is adjusted to A1→B1→B0→A0.

In this example, the specific implementation of constructing a motion information candidate list is as follows:
1. Checking the spatial candidate blocks of the current image block in the order of B1→A1→A0→B0→B2 to determine the spatial candidate motion information, and adding the determined spatial candidate motion information to the motion information candidate list;
   or checking the spatial candidate blocks of the current image block in the order of B1→A1→A0→B0→(B2) to determine the spatial candidate motion information, and adding the determined spatial candidate motion information to the motion information candidate list;
   as an example, when the motion information of the top 4 spatial candidate blocks are not all usable (that is, at least one is not usable), B2 is checked;
   or checking the spatial candidate blocks of the current image block in the order of B1→A1→A0→B0 to determine the spatial candidate motion information, and adding the determined spatial candidate motion information to the motion information candidate list;
   or checking the spatial candidate blocks of the current image block in the order of A1→B1→B0→A0 to determine the spatial candidate motion information, and adding the determined spatial candidate motion information to the motion information candidate list;
2. Determining temporal candidate motion information, and adding the determined temporal candidate motion information to the motion information candidate list;
3. If the number of pieces of candidate motion information in the motion information candidate list is insufficient, constructing a motion information list of coded/decoded blocks based on the motion information of the coded/decoded blocks, and adding the motion information in the motion information list of coded/decoded blocks to the motion information candidate list as candidate motion information;
   as an example, the motion information list of coded/decoded blocks has a constant length, and the motion information of the coded/decoded blocks in the motion information list is updated based on the first-in-first-out rule;
4. If there is bi-directional motion information in the motion information candidate list, replacing the bi-directional motion information with forward motion information or/and backward motion information of the bi-directional motion information;
5. If the number of pieces of candidate motion information in the motion information candidate list is still insufficient, obtaining the top two pieces of candidate motion information (if any) in the motion information candidate list, and adding motion information obtained by weighting the top two pieces of candidate motion information to the motion information candidate list;
   as an example, the pieces of candidate motion information in the motion information candidate list are sorted in an order of the unidirectional motion information, the forward motion information of the bi-directional motion information, and the backward motion information of the bi-directional motion information, and the motion information obtained by the weighting;
6. If the number of pieces of candidate motion information in the motion information candidate list is still insufficient, filling the list with default motion information (zero motion information).

EXAMPLE SIX

In this example, an example of constructing a motion information candidate list in the triangle prediction merge mode is given below.

In this example, for the triangle prediction merging mode, the checking order for the spatial candidate blocks of the current image block is adjusted to B1→A1→A0→B0→B2; or the checking order for the spatial candidate blocks of the current image block is adjusted to B1→A1→A0→B0→(B2); or the checking order for the spatial candidate blocks of the current image block is adjusted to B1→A1→A0→B0; or the checking order for the spatial candidate blocks of the current image block is adjusted to A1→B1→B0→A0.

In this example, the specific implementation of constructing a motion information candidate list is as follows:
1. Checking the spatial candidate blocks of the current image block in the order of B1→A1→A0→B0→B2 to determine the spatial candidate motion information, and adding the determined spatial candidate motion information to the motion information candidate list;
or checking the spatial candidate blocks of the current image block in the order of B1→A1→A0→B0→(B2) to determine the spatial candidate motion information, and adding the determined spatial candidate motion information to the motion information candidate list;
as an example, when the motion information of the top 4 spatial candidate blocks are not all usable (that is, at least one is not usable), B2 is checked;
or checking the spatial candidate blocks of the current image block in the order of B1→A1→A0→B0 to determine the spatial candidate motion information, and adding the determined spatial candidate motion information to the motion information candidate list;
or checking the spatial candidate blocks of the current image block in the order of A1→B1→B0→A0 to determine the spatial candidate motion information, and adding the determined spatial candidate motion information to the motion information candidate list;
2. Determining temporal candidate motion information, and adding the determined temporal candidate motion information to the motion information candidate list;
3. If the number of pieces of candidate motion information in the motion information candidate list is insufficient, constructing a motion information list of coded/decoded blocks based on the motion information of the coded/decoded blocks, and adding the motion information in the motion information list of coded/decoded blocks to the motion information candidate list as candidate motion information;
as an example, the motion information list of coded/decoded blocks has a constant length, and the motion information of the coded/decoded blocks in the motion information list is updated based on a first-in first-out rule;
4. If the number of pieces of candidate motion information in the motion information candidate list is still insufficient, filling the list with default motion information (zero motion information);
5. If there is bi-directional motion information in the motion information candidate list, replacing the bi-directional motion information with forward motion information or/and backward motion information of the bi-directional motion information.

EXAMPLE SEVEN

In this example, an example of constructing a motion information candidate list in the affine merge mode is given below.

In this example, for the affine merge mode, the checking order for the spatial candidate blocks of the current image block is adjusted to: first traversing the spatial candidate blocks (B0-B1-B2) on top of the current image block, and then traversing spatial candidate blocks (A0-A1) on the left of the current image block; or first traversing the spatial candidate blocks (B0-B1) on top of the current image block, and then traversing the spatial candidate blocks (A0-A1) on the left of the current image block; or first traversing the spatial candidate blocks (A0-A1) on the left of the current image block, and then traversing the spatial candidate blocks (B0-B1) on top of the current image block.

In this example, the specific implementation of constructing a motion information candidate list is as follows:
1. Checking the spatial candidate blocks of the current image block in the order of B0→B1→B2→A0→A1 to determine the spatial candidate motion information, performing mapping and calculation on the determined spatial candidate motion information to obtain candidate motion information, and adding the obtained candidate motion information to the motion information candidate list;
or checking the spatial candidate blocks of the current image block in the order of B0→B1→A0→A1 to determine the spatial candidate motion information, performing mapping and calculation on the determined spatial candidate motion information to obtain candidate motion information, and adding the obtained candidate motion information to the motion information candidate list;
or checking the spatial candidate blocks of the current image block in the order of A0→A1→B0→B1 to determine the spatial candidate motion information, performing mapping and calculation on the determined spatial candidate motion information to obtain candidate motion information, and adding the obtained candidate motion information to the motion information candidate list:
2. Performing mapping and calculation on a combination of two or three pieces of the motion information in the top-left corner, the motion information in the top-right corner, the motion information in the bottom-left corner of the current image block and the temporal domain motion information to obtain candidate motion information, and then adding the candidate motion information to the motion information candidate list;

For example, as shown in FIG. 5B, the first piece of usable motion information obtained can be determined as the motion information in the top-left corner of the current image block by traversing the motion information of positions A2, B2, and B3 in a certain order. Similarly, the first piece of usable motion information obtained can be determined as the motion information in the top-right corner of the current image block by traversing the motion information of positions B1 and B0 in a certain order. The first piece of usable motion information obtained can be determined as the motion information in the bottom-left corner of the current image block by traversing the motion information of positions A0 and A1 in a certain order. The temporal motion information can be the temporal motion information of the position T.
3. If the number of pieces of candidate motion information in the motion information candidate list is still insufficient, filling the list with default motion information (zero motion information).

EXAMPLE EIGHT

In this example, an example of constructing a motion information candidate list in the ATMVP mode is given below.

In this example, for the ATMVP mode, only the spatial candidate block B1 is checked about whether the motion information of the block B1 is usable; if the motion information of the block B1 is usable, the motion information of the block B1 is used to construct the motion information candidate list; otherwise, default motion information (such as zero motion information) is used to construct the motion information candidate list.

EXAMPLE NINE

In this example, an example of constructing sub-block technology based motion information candidate list is given below.

In this example, considering that both the affine merge mode and the ATMVP merge mode are used to perform prediction coding based on motion information of sub-blocks. Therefore, when constructing the motion information candidate list, a sub-block technology based motion information candidate list can be constructed, and the mode of each piece of candidate motion information can be marked.

In this example, the candidate motion information of the ATMVP merge mode can be determined first, and then, the candidate motion information of the affine merge mode can be determined.

As an example, for the ATMVP merge mode, if the motion information of B1 is usable, the motion information of B1 is directly used as candidate motion information; if the motion information of B1 is not usable, default motion information (zero motion information) is used as the candidate motion information.

For the affine merge mode, the specific implementation of constructing a motion information candidate list is as follows:
1. Checking the spatial candidate blocks of the current image block in the order of B0→B1→B2→A0→A1 to determine the spatial candidate motion information, performing mapping and calculation on the determined spatial candidate motion information to obtain the candidate motion information, and adding the obtained candidate motion information to the motion information candidate list;
or checking the spatial candidate blocks of the current image block in the order of B0→B1→A0→A1 to determine the spatial candidate motion information, performing mapping and calculation on the determined spatial candidate motion information to obtain the candidate motion information, and adding the obtained candidate motion information to the motion information candidate list;
or checking the spatial candidate blocks of the current image block in the order of A0→A1→B0→B1 to determine the spatial candidate motion information, performing mapping and calculation on the determined spatial candidate motion information to obtain the candidate motion information, and adding the obtained candidate motion information to the motion information candidate list;
2. Performing mapping and calculation on a combination of two or three pieces of the motion information in the top-left corner, the motion information in the top-right corner, the motion information in the bottom-left corner of the current image block and the temporal domain motion information to obtain candidate motion information, and then adding the obtained candidate motion information to the motion information candidate list;
3. If the number of pieces of candidate motion information in the motion information candidate list is still insufficient, filling the list with default motion information (zero motion information).

EXAMPLE TEN

In this example, for the merge mode, the IBC merge mode, the triangle prediction merge mode, and the affine merge mode, when checking the spatial candidate blocks of the current image block, the checking order for the spatial candidate blocks on top of the current image block is prior to the checking order for the spatial candidate blocks on the left of the current image block.

As an example, for an image block in the merge mode, the checking order for the spatial candidate blocks is: B1→A1→A0→B0→(B2);
for an image block in the IBC merge mode, the checking order for the spatial candidate blocks is: B1→A1→A0→B0→(B2);
for an image block in the triangle prediction merge mode, the checking order for the spatial candidate blocks is: B1→A1→A0→B0→B2;
for an image block in the affine merge mode, the checking order for the spatial candidate blocks is: B0→B1→B2→A0→A1.

EXAMPLE ELEVEN

In this example, for the merge mode, the IBC merge mode, the triangle prediction merge mode, and the affine merge mode, when checking the spatial candidate blocks of the current image block, the checking order for the spatial candidate blocks on top of the current image block is prior to the checking order for the spatial candidate blocks on the left of the current image block, and B2 may not be checked.

As an example, for an image block in the merge mode, the checking order for the spatial candidate blocks is: B1→A1→A0→B0;
for an image block in the IBC merge mode, the checking order for the spatial candidate blocks is: B1→A1→A0→B0;
for an image block in the triangle prediction merge mode, the checking order for the spatial candidate blocks is: B1→A1→A0→B0;
for an image block in the affine merge mode, the checking order for the spatial candidate blocks is: B0→B1→A0→A1.

It should be noted that in this example, in addition to the above methods for checking spatial candidate blocks in which B2 is not checked for any of the image blocks in the merge mode, the image blocks in the IBC merge mode, the image blocks in the triangle prediction merge mode, and the image blocks in the affine merge mode, it is possible that B2 is not checked for image blocks in only one of the merge mode, the IBC merge mode, the triangle prediction merge mode, and the affine merge mode, or that B2 is not checked for image blocks in two of the modes, or that B2 is checked for image blocks in only one of the modes.

For example, for an image block in the merge mode, B2 may not be checked; for an image block in the IBC merge mode, an image block in the triangle prediction merge mode, and an image block in the affine merge mode, B2 is checked.

For another example, for an image block in the merge mode and an image block in the IBC merge mode, B2 may not be checked; for an image block in the triangle prediction merge mode and an image block in the affine merge mode, B2 is checked.

EXAMPLE TWELVE

In this example, an example of constructing a motion information candidate list in the AMVP mode is given below.

In this example, for the AMVP mode, the checking order for the spatial candidate blocks of the current image block is adjusted to: first traversing the spatial candidate blocks on top of the current image block, and then proceeding to traverse the spatial candidate blocks on the left of the current image block.

As an example, the checking order for the spatial candidate blocks on top of the current image block can be B0→B1→B2; the checking order for the spatial candidate blocks on the left of the current image block can be A0→A1.

In this example, for the AMVP mode, when the spatial candidate blocks on top of the current image block are traversed in the traversal order of B0→B1→B2, a piece of usable motion information can be obtained; or when the motion information of the spatial candidate blocks on top of the current image block is available but none of motion information of the spatial candidate blocks on top of the current image block is usable, it is also necessary to traverse a scaled block (scaled B0) corresponding to B0, a scaled block (scaled B1) corresponding to B1, and a scaled block corresponding to B2 (scaled B2) to obtain usable motion information; or, when none of the motion information of the spatial candidate blocks on top of the current image block is available, 0 piece of usable motion information is obtained.

When traversing the spatial candidate blocks on the left of the current image block based on the traversal order of A0→A1, one piece of usable motion information or 0 piece of usable motion information can be obtained;

as an example, when the motion information of the spatial candidate blocks on the left of the current image block is available, and none of the motion information of the spatial candidate blocks on the top is available, a scaled block (scaled A0) corresponding to A0 and a scaled block (scaled A1) corresponding to A1 are traversed in turn, to obtain one piece of usable motion information.

EXAMPLE THIRTEEN

In this example, an example of constructing a motion information candidate list in the IBC AMVP mode is given below.

In this example, for the IBC AMVP mode, the spatial candidate blocks on top of the current image block are traversed first, and then the spatial candidate blocks on the left of the current image block are traversed.

As an example, the checking order for the spatial candidate blocks on top of the current image block can be B0→B1→B2; the checking order for the spatial candidate blocks on the left of the current image block can be A0→A1.

EXAMPLE FOURTEEN

An example constructing a motion information candidate list in the affine AMVP mode is given below.

In this example, for the affine AMVP mode, the spatial candidate blocks on top of the current image block are traversed first, and then the spatial candidate blocks on the left of the current image block are traversed.

As an example, the checking order for the spatial candidate blocks on top of the current image block can be B0→B1→B2; the checking order for the spatial candidate blocks on the left of the current image block can be A0→A1.

It should be noted that in this example, when traversing the motion information of the spatial candidate block, it is necessary to check whether the spatial candidate block is an affine block, and whether there is affine motion information stored; if it is an affine block and there is stored affine motion information, it is determined that the motion information of the spatial candidate block is usable; otherwise, it is determined that the motion information of the spatial candidate block is unusable.

EXAMPLE FIFTEEN

For the merge mode, the IBC merge mode, the triangle prediction merge mode, and the affine merge mode, when checking the spatial candidate blocks of the current image block, the checking order for the spatial candidate blocks on top of the current image block is prior to the checking order for the spatial candidate blocks on the left of the current image block.

As an example, for an image block in the merge mode, the checking order for the spatial candidate blocks is: B1→A1→A0→B0→(B2);

for an image block in the IBC merge mode, the checking order for the spatial candidate blocks is: B1→A1→A0→B0→(B2);

for an image block in the triangle prediction merge mode, the checking order for the spatial candidate blocks is: B1→A1→A0→B0→B2;

for an image block in the affine merge mode, the checking order for the spatial candidate blocks is: B0→B1→B2→A0→A1.

For the AMVP mode, the checking order for the spatial candidate blocks of the current image block is adjusted to: first traversing the spatial candidate blocks on top of the current image block in the order of B0→B1→B2, and then traversing the spatial candidate blocks on the left of the current image block in the order of A0→A1.

As an example, for the AMVP mode, when the spatial candidate blocks on top of the current image block are traversed based on the traversal order of B0→B1→B2, a piece of usable motion information can be obtained; or, when the motion information of the spatial candidate blocks on top of the current image block is available but none of the motion information of the spatial candidate blocks on top of the current image block is unusable, it is also necessary to traverse the scaled block (scaled B0) corresponding to B0, the scaled block (scaled B1) corresponding to B1, and the scaled block (scaled B2) corresponding to B2, to obtain a piece of usable motion information; or, when none of the motion information of the spatial candidate blocks on top of the current image block is available, 0 piece of usable motion information is obtained.

When traversing the spatial candidate blocks on the left of the current image block based on the traversal order of A0→A1, one piece of usable motion information or 0 piece of usable motion information can be obtained;

as an example, when the motion information of the spatial candidate blocks on the left of the current image block is available, and the motion information of the spatial candidate blocks on the top is not available, the scaled block (scaled A0) corresponding to A0 and the scaled block (scaled A1) corresponding to A1 are traversed in turn, to obtain one piece of usable motion information.

In this example, for the IBC AMVP mode, the checking order for the spatial candidate blocks of the current image block is adjusted to: first traversing the spatial candidate blocks on top of the current image block in the order of B0→B1→B2, and then traversing the spatial candidate blocks on the left of the current image block in the order of A0→A1.

In this example, for the affine AMVP mode, the checking order for the spatial candidate blocks of the current image block is adjusted to: first traversing the spatial candidate blocks on top of the current image block in the order of B0→B1→B2, and then traversing the spatial candidate blocks on the left of the current image block in the order of A0→A1.

As an example, for the affine AMVP mode, when traversing the motion information of the spatial candidate blocks, it is necessary to check whether the spatial candidate block is an affine block, and whether there is affine motion information stored; if it is an affine block and there is stored affine motion information, it is determined that the motion information of the spatial candidate block is usable; otherwise, it is determined that the motion information of the spatial candidate block is unusable.

EXAMPLE SIXTEEN

For the merge mode, the IBC merge mode, the triangle prediction merge mode, and the affine merge mode, when checking the spatial candidate blocks of the current image block, B2 is not checked.

As an example, for an image block in the merge mode, the checking order for the spatial candidate blocks is: A1→B1→B0→A0;

for an image block in the IBC merge mode, the checking order for the spatial candidate blocks is: A1→B1→B0→A0;

for an image block in the triangle prediction merge mode, the checking order for the spatial candidate blocks is: A1→B1→B0→A0;

for an image block in the affine merge mode, the checking order for the spatial candidate blocks is: A0→A1→B0→B1.

For the AMVP mode, when checking the spatial candidate blocks of the current image block, B2 is not checked.

As an example, for the AMVP mode, when the spatial candidate blocks on the left of the current image block is traversed based on the traversal order of A0→A1, one piece of usable motion information can be obtained; or when the motion information of the spatial candidate blocks on the left of the current image block is available but none of the motion information of the spatial candidate blocks on the left of the current image block is usable, it is also necessary to traverse the scaled block (scaled A0) corresponding to A0 and the scaled block (scaled A1) corresponding to A1 to obtain one piece of usable motion information; or when none of the motion information of the spatial candidate blocks on the left of the current image block is available, 0 piece of usable motion information is obtained.

When traversing the spatial candidate blocks on top of the current image block based on the traversal order of B0→B1, one piece of usable motion information or 0 piece of usable motion information can be obtained;

as an example, when the motion information of the spatial candidate blocks on top of the current image block is available, and none of the motion information of the spatial candidate blocks on the left is available, the scaled block (scaled B0) corresponding to B0 and the scaled block (scaled B1) corresponding to B1 are sequentially traversed to obtain one piece of usable motion information.

In this example, for the IBC AMVP mode, the checking order for the spatial candidate blocks of the current image block is: first traversing the spatial candidate blocks on the left of the current image block in the order of A0→A1, and then traversing the spatial candidate blocks on top of the current image block in the order of B0→B1.

In this example, for the affine AMVP mode, the checking order for the spatial candidate blocks of the current image block is: first traversing the spatial candidate blocks on the left of the current image block in the order of A0→A1, and then traversing the spatial candidate blocks on top of the current image block in the order of B0→B1.

As an example, for the affine AMVP mode, when traversing the motion information of the spatial candidate blocks, it is necessary to check whether the spatial candidate block is an affine block, and whether there is affine motion information storage stored; if it is an affine block, and there is affine motion information stored, it is determined that the motion information of the spatial candidate block is usable; otherwise, it is determined that the motion information of the spatial candidate block is not usable.

In the example of the present disclosure, the checking order for the spatial candidate blocks of the current image block is determined, and the spatial candidate motion information is determined based on the determined checking order, and further a motion information candidate list corresponding to the current image block can be constructed based on the spatial candidate motion information. By utilizing the characteristics that the probability of the motion information of the spatial candidate blocks on top of the current image block being finally selected for predicting motion information is higher than the probability of the motion information of the spatial candidate blocks on the left of the current image block being finally selected for predicting motion information, overhead in coding indices can be reduced, and the coding performance can be improved.

Figure 6:
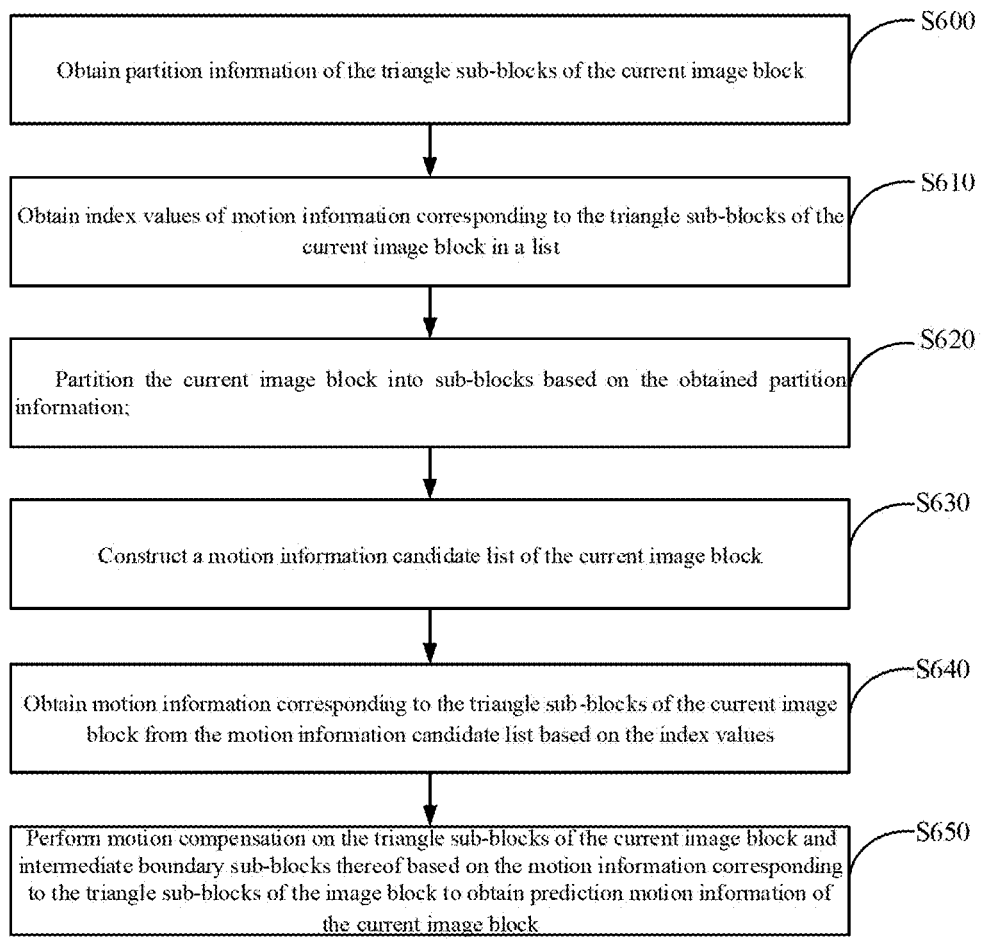
FIG. 6 is a schematic flowchart of a method for triangle prediction decoding according to an example of the present disclosure.

Referring to FIG. 6, which schematically illustrates a method for triangle prediction decoding according to an example of the present disclosure. As shown in FIG. 6, the method for triangle prediction decoding can include the following steps.

At Step S600, partition information of triangle sub-blocks of a current image block is obtained.

At Step S610, index values of motion information corresponding to the triangle sub-blocks of the current image block in a list are obtained.

At Step S620, sub-block partition on the current image block is performed based on the obtained partition information.

In the example of the present disclosure, the specific implementation of step S600 to step S620 can refer to the related description in the existing triangle prediction decoding process, which is not repeated in the example of the present disclosure.

As an example, the current image block can be partitioned into sub-blocks by dividing the current block based on a diagonal line (in a direction having an angle of 45 degrees with the right horizontal direction) or based on an oblique diagonal line (in a direction having an angle of 135 degrees with the right horizontal direction).

At Step S630, a motion information candidate list is constructed for the current image block.

As an implementation of the present disclosure, the motion information candidate list of the current image block can refer to the method for constructing a motion information candidate list in the triangle prediction merge mode described in any of the above method examples.

As another implementation of the present disclosure, the motion information candidate list of the current image block can refer to the method for constructing a motion information candidate list in the merge mode described in any of the above method examples.

As the first example of this implementation, the method for constructing a motion information candidate list in the merge mode can be adopted. If certain candidate motion information is bi-directional motion information, the forward motion information of the bi-directional motion information is used.

As the second example of this implementation, the method for constructing a motion information candidate list in the merge mode can be adopted. If certain candidate motion information is bi-directional motion information, the forward motion information and the backward motion information of the bi-directional motion information is used.

As the third example of this implementation, a partial motion information candidate list in the merge mode can be adopted, and the partial motion information candidate list includes spatial candidate motion information and temporal candidate motion information. If certain candidate motion information is bi-directional motion information, the forward motion information of the bi-directional motion information is used.

As the fourth example of this implementation, a partial motion information candidate list in the merge mode can be used, and the partial motion information candidate list includes spatial candidate motion information and temporal candidate motion information. If certain candidate motion information is bi-directional motion information, the forward motion information and backward motion information of the bi-directional motion information are used.

As the fifth example of this implementation, a partial motion information candidate list in the merge mode can be used, and the partial motion information candidate list includes spatial candidate motion information. If certain candidate motion information is bi-directional motion information, the forward motion information of the bi-directional motion information is used.

As the sixth example of this implementation, a partial motion information candidate list in the merge mode can be adopted, and the partial motion information candidate list includes spatial candidate motion information. If certain candidate motion information is bi-directional motion information, the forward motion information and backward motion information of the bi-directional motion information are used.

At Step S640, based on the obtained index values, motion information corresponding to the triangle sub-blocks of the current image block are obtained from the constructed motion information candidate list.

At Step S650, based on the obtained motion information corresponding to the triangle sub-blocks of the current image block, motion compensation is performed on the triangle sub-blocks of the current image block and intermediate boundary sub-blocks thereof, to obtain prediction motion information of the current image block.

In the example of the present disclosure, the specific implementation of step S640 to step S650 can refer to the related description in the existing triangle prediction decoding process, which is not repeated in the example of the present disclosure.

Figure 7:
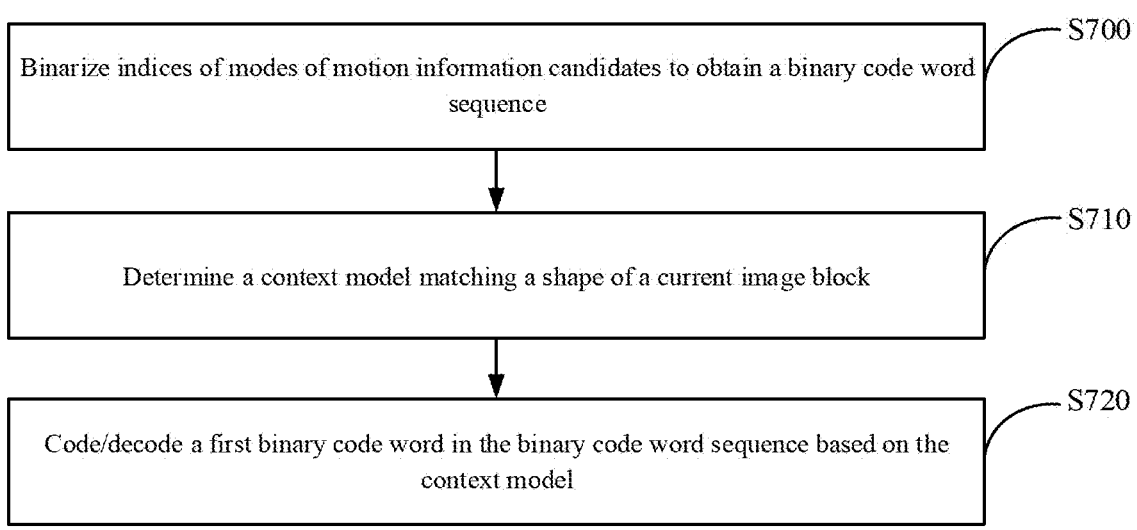
FIG. 7 is a schematic flowchart of a method for coding/decoding indices according to an example of the present disclosure.

Referring to FIG. 7, FIG. 7 is a schematic flowchart of a method for coding/decoding indices according to an example of the present disclosure. As shown in FIG. 7, the method for coding/decoding indices can include the following steps:

at Step S700, indices of modes of motion information candidates are binarized to obtain a binary code word sequence;

at Step S710, a context model matching a shape of a current image block is determined;

at Step S720, a first binary code word in the binary code word sequence is coded/decoded based on the context model.

In this example of the application, when the indices of the modes of the motion information candidates need to be coded, the indices of the modes of the motion information candidates need to be binarized first to obtain the corresponding binary code word sequence.

For example, the corresponding binary code word sequence of the indices of the traditional merge mode can be as shown in Table 1:

TABLE 1

| 0 | 0 |
| 1 | 10 |
| 2 | 110 |
| 3 | 1110 |
| 4 | 11110 |
| 5 | 11111 |

In this example of the application, considering that the shape of the current image block can vary, the candidate motion information that is finally selected as the prediction motion information will be different. Therefore, when Context-based Adaptive Binary Arithmetic Coding (CABAC) is adopted to code the first binary code word in the binary code word sequence corresponding to the indices of the modes of the motion information candidates, if a fixed context model is used for coding, the coding performance will be reduced.

Therefore, in order to improve the coding performance, in this example of the application, after binarizing the indices of the modes of the motion information candidates, the matching context model can be determined based on the shape of the current image block, and based on the determined context model, the first binary code word of the binary code word sequence is coded/encoded.

As an example, the shape of the current image block can be characterized by the aspect ratio of the current image block;

determining a context model matching the shape of the current image block can include:

if the aspect ratio of the current image block is larger than or equal to 1, determining that the context model matching the shape of the current coding block is a first context model;

if the aspect ratio of the current image block is smaller than 1, determining that the context model matching the shape of the current coding block is a second context model.

In this example, considering that when the aspect ratio of the current image block is larger than or equal to 1, the probability that B1 is finally selected to predict motion information is higher than the probability that A1 is finally selected to predict motion information. Therefore, when the aspect ratio of the current image block is larger than or equal to 1, a context model (referred to as a first context model herein) with better performance when B1 is finally selected to predict motion information can be selected, and based on the first context model, the first binary code word in the binary code word sequence is coded/encoded.

When the aspect ratio of the current image block is smaller than 1, the probability that A1 is finally selected to predict motion information is higher than the probability that B1 is finally selected to predict motion information. Therefore, when the aspect ratio of the current image block is smaller than 1, a context model (referred to as a second context model herein) with better performance when A1 is finally selected to predict motion information can be selected, and based on the second context model, the first binary code word in the binary code word sequence is coded/encoded.

Figure 8:
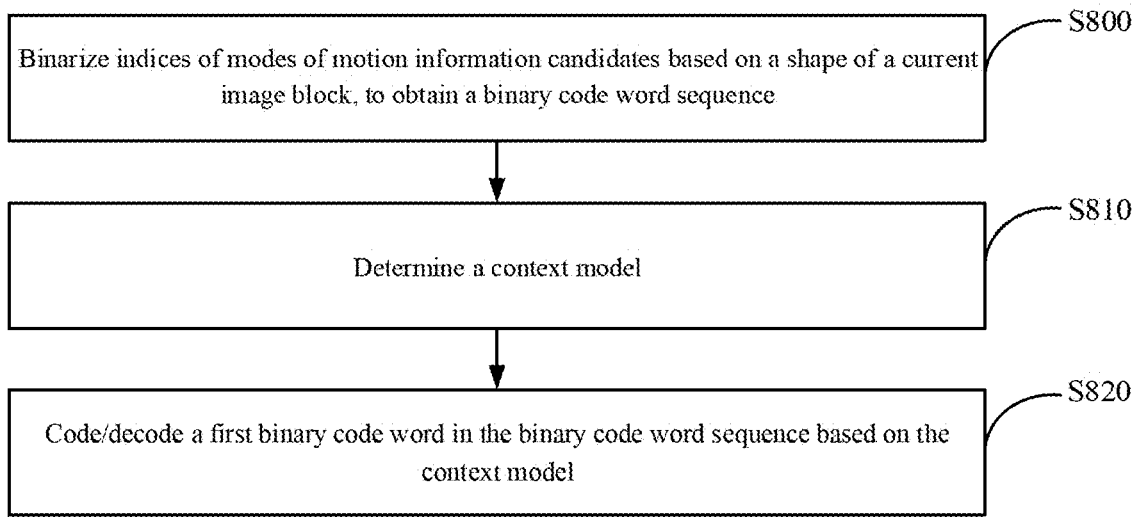
FIG. 8 is a schematic flowchart of a method for coding/decoding indices according to an example of the present disclosure.

Referring to FIG. 8, FIG. 8 is a schematic flowchart of a method for coding/decoding indices according to an example of the present disclosure. As shown in FIG. 8, the method for coding/decoding indices can include the following steps.

At Step S800, indices of modes of motion information candidates are binarized based on a shape of a current image block, to obtain a binary code word sequence.

At Step S810, a context model is determined.

At Step S820, a first binary code word in the determined binary code word sequence is coded/decoded based on the determined context model.

In this example of the application, when the indices of the modes of the motion information candidates need to be coded, the indices of the modes of the motion information candidates need to be binarized first to obtain the corresponding binary code word sequence.

In the example of the present disclosure, considering that the shape of the current image block is different, the candidate motion information that is finally selected as the prediction motion information will be different. Therefore, using a fixed binary code word sequence for the index of the motion information candidate's mode will reduce coding performance.

In the example of the present disclosure, in order to improve the coding performance, when the indices of the modes of the motion information candidates need to be coded, the indices of the modes of the motion information candidates can be binarized based on the shape of the current image block.

As an example, the state of the current image block can be characterized by an aspect ratio of the current image block;

binarizing indices of modes of the motion information candidates based on the shape of the current image block can include:

if the aspect ratio of the current image block is larger than or equal to 1, binarizing the indices of the modes of the motion information candidates based on a first binarization mode; where in the first binarization mode, the second index corresponds to 1 bit binary code word sequence;

if the aspect ratio of the current image block is smaller than 1, binarizing the indices of the modes of the motion information candidates based on a second binarization mode; where in the second binarization mode, the first index corresponds to 1 bit binary code word sequence.

In this example, considering that when the aspect ratio of the current image block is larger than or equal to 1, the probability that B1 is finally selected for predicting motion information is higher than the probability that A1 is finally selected for predicting motion information. Therefore, when the aspect ratio of the current image block is larger than or equal to 1, a binarization method (referred to as a first binarization method herein) in which the second index corresponds to a 1 bit binarization code word sequence can be selected to binarize the indices of the modes of the motion information candidates.

When the aspect ratio of the current image block is smaller than 1, the probability that A1 is finally selected for predicting motion information is higher than the probability that B1 is finally selected for predicting motion information. Therefore, when the aspect ratio of the current image block is smaller than 1, a binarization method (referred to as a second binarization method herein) in which the first index corresponds to a 1 bit binary code word sequence can be selected to binarize the indices of the modes of the motion information candidates.

For example, the corresponding relationship between the indices of the modes of the motion information candidates and the binarization code word sequence in the first binarization mode and the second binarization mode can be as shown in Table 2:

TABLE 2

| | Width < height | Width >= height |
| --- | --- | --- |
| 0 | 0 | 10 |
| 1 | 10 | 0 |
| 2 | 110 | 110 |
| 3 | 1110 | 1110 |
| 4 | 11110 | 11110 |
| 5 | 11111 | 11111 |

In the example of the present disclosure, the indices of the modes of the motion information candidates are binarized based on the shape of the currently coded image block, and after the binary code word sequence is obtained, the context model can be determined, and the first binary code word in the determined binary code word sequence is coded/decoded based on the determined context model.

The method provided in the present disclosure has been described above. The following will describe an apparatus provided by the present disclosure.

Figure 9:
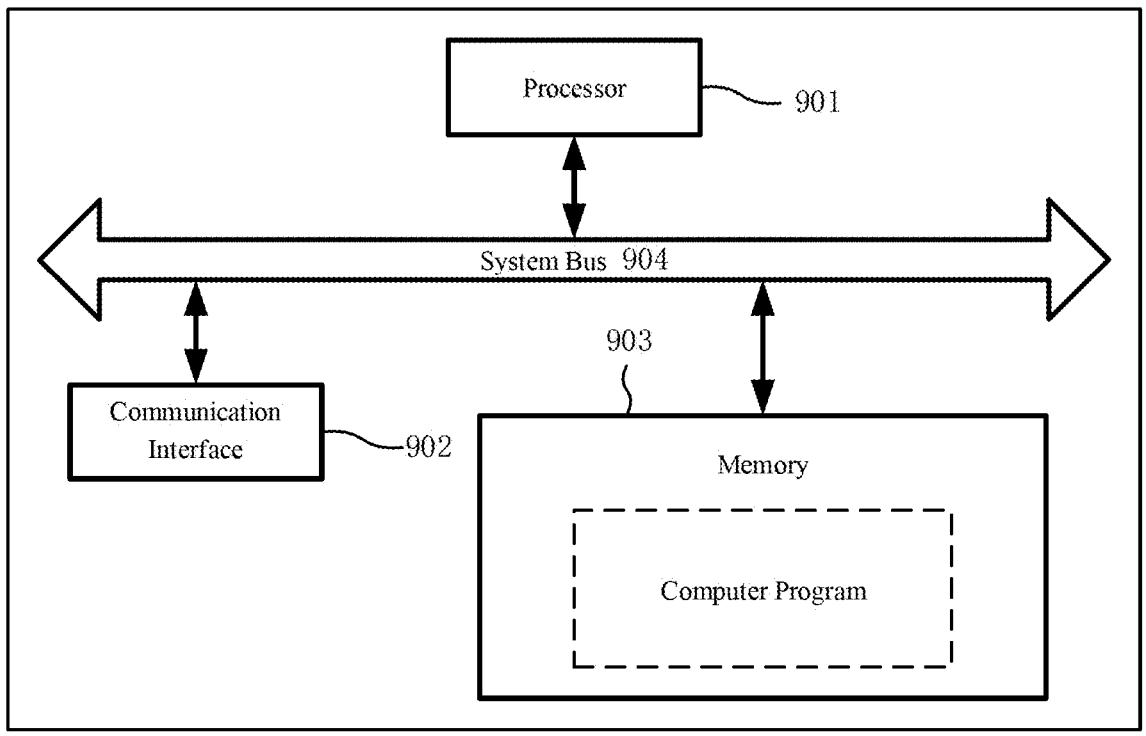
FIG. 9 is a schematic diagram of a hardware structure of an apparatus for constructing a motion information candidate list according to an example of the present disclosure.

Referring to FIG. 9, FIG. 9 is a schematic diagram of a hardware structure of an apparatus for constructing a motion information candidate list according to an example of the present disclosure. The apparatus for constructing a motion information candidate list can include a processor 901, a communication interface 902, a memory 903, and a communication bus 904. The processor 901, the communication interface 902, and the memory 903 communicate with each other via the communication bus 904. A computer program is stored in the memory 903; the processor 901 can implement the method for constructing a motion information candidate list by executing the program stored in the memory 903.

The memory 903 mentioned herein can be any electronic, magnetic, optical or other physical storage device, and can contain or store information, such as executable instructions, data, and so on. For example, the memory 903 can be: a Random Access Memory (RAM), a volatile memory, a non-volatile memory, a flash memory, a storage drive (such as a hard drive), a solid state drive, and any type of storage disks (such as an optical disk, DVD, etc.), or similar storage media, or a combination thereof.

Figure 10:
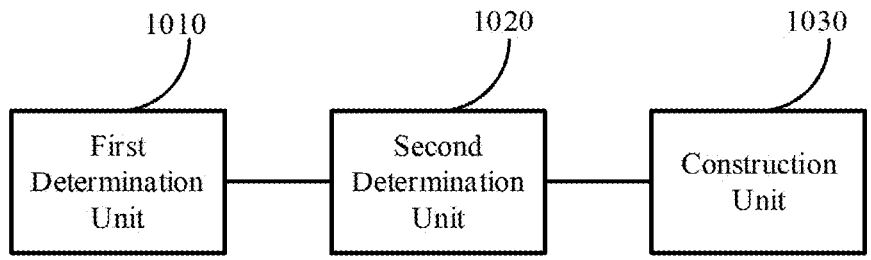
FIG. 10 is a schematic block diagram of an apparatus for constructing a motion information candidate list according to an example of the present disclosure.

As shown in FIG. 10, in terms of functions, the apparatus for constructing a motion information candidate list can include: a first determination unit 1010, a second determination unit 1020, and a construction unit 1030, wherein the first determination unit 1010 is configured to determine a checking order for each of spatial candidate blocks of a current image block; wherein the checking order for the spatial candidate block on top of the current image block is prior to the checking order for the spatial candidate block on the left of the current image block;

the second determination unit 1020 is configured to determine spatial candidate motion information based on the checking order;

the constructing unit 1030 is configured to construct a motion information candidate list corresponding to the current image block based on the spatial candidate motion information.

As an implementation, the first determination unit 1010 is specifically configured to determine a prediction mode for the current image block; and determine the checking order for each of the spatial candidate blocks of the current image block based on the prediction mode.

As an implementation, when the prediction mode is a merge mode, an intra block copy IBC merge mode, an affine merge mode or a triangle prediction merge mode, the checking order includes at least a traversal order for 4 spatial candidate blocks, the traversal order for 4 spatial candidate blocks is prior to that for a fifth spatial candidate block, and the fifth spatial candidate block is a spare spatial candidate block;

wherein the 4 spatial candidate blocks include a first spatial candidate block, a second spatial candidate block, a third spatial candidate block, and a fourth spatial candidate block, wherein the first spatial candidate block is the lowermost spatial neighboring block on the left of the current image block; the second spatial candidate block is the rightmost spatial neighboring block on top of the current image block; the third spatial candidate block is the spatial neighboring block closest to the top-right corner of the current image block; the fourth spatial candidate block is the spatial neighboring block closest to the bottom-left corner of the current image block; and the fifth spatial candidate block is the spatial neighboring block with the closest distance to the top-left corner of the current image block.

As an implementation, the traversal order of the 4 spatial candidate blocks is a first traversal order, and the first traversal order is to sequentially traverse the second spatial candidate block, the first spatial candidate block, the fourth spatial candidate block and the third spatial candidate block.

As an implementation, the constructing unit 1030 is specifically configured to, when the prediction mode is the merge mode, construct the motion information candidate list corresponding to the current image block based on the spatial candidate motion information, temporal candidate motion information, and motion information of coded/decoded blocks of the current image block.

As an implementation, the construction unit 1030 is further configured to weight the motion information existing in the motion information candidate list; and add motion information obtained by the weighting as candidate motion information to the motion information candidate list corresponding to the current image block.

As an implementation, the construction unit 1030 is specifically configured to, when the prediction mode is the IBC merge mode, construct a motion information candidate list corresponding to the current image block based on the spatial candidate motion information and the motion information of the coded/decoded blocks of the current image block.

As an implementation, the construction unit 1030 is further configured to weight the motion information existing in the motion information candidate list; and add motion information obtained by the weighting as candidate motion information to the motion information candidate list corresponding to the current image block.

As an implementation, when the prediction mode is the triangle prediction merge mode or the affine merge mode, the checking order includes the traversal order for 5 spatial candidate blocks;

wherein the 5 spatial candidate blocks include a first spatial candidate block, a second spatial candidate block, a third spatial candidate block, a fourth spatial candidate block, and a fifth spatial candidate block, wherein the first spatial candidate block is the lowermost spatial neighboring block on the left of the current image block, the second spatial candidate block is the rightmost spatial neighboring block on top of the current image block, the third spatial candidate block is the spatial neighboring block closest to the top-right corner of the current image block, the fourth spatial candidate block is the spatial neighboring block closest to the bottom-left corner of the current image block, and the fifth spatial candidate block is the spatial neighboring block closest to the top-left corner of the current image block.

As an implementation, when the prediction mode is the triangle prediction merge mode, the traversal order for the 5 spatial candidate blocks is a second traversal order, and the second traversal order is to sequentially traverse the second spatial candidate block, the first spatial candidate block, the fourth spatial candidate block, the third spatial candidate block, and the fifth spatial candidate block.

As an implementation, the constructing unit 1030 is specifically configured to, when the prediction mode is the triangle prediction combination mode, construct a motion information candidate list corresponding to the current image block based on the spatial candidate motion information and the temporal candidate motion information;

wherein if the candidate motion information is bi-directional motion information, the forward motion information or/and the backward motion information of the bi-directional motion information is added to the motion information candidate list.

As an implementation, the constructing unit 1030 is specifically configured to, when the prediction mode is the triangle prediction merge mode, construct a motion information candidate list corresponding to the current image block based on the spatial candidate motion information, the temporal candidate motion information, and the motion information of the coded/decoded blocks;

wherein if the candidate motion information is bi-directional motion information, the forward motion information or/and the backward motion information of the bi-directional motion information is added to the motion information candidate list.

As an implementation, the construction unit 1030 is further configured to obtain the top two pieces of candidate motion information in the motion information candidate list; and add motion information obtained by weighting the top two pieces of candidate motion information to the motion information candidate list.

As an implementation, the pieces of candidate motion information in the motion information candidate list is sorted in an order of the unidirectional motion information, the forward motion information of the bi-directional motion information, and the backward motion information of the bi-directional motion information, and weighted candidate motion information.

As an implementation, when the prediction mode is the affine merge mode, the traversal order for the 5 spatial candidate blocks is a third traversal order, and the third traversal order is to sequentially traverse the third spatial candidate block, the second spatial candidate block, the fifth spatial candidate block, the fourth spatial candidate block, and the first spatial candidate block.

As an implementation, the construction unit 1030 is configured to, when the prediction mode is the affine merge mode, perform mapping and calculation on the spatial domain candidate motion information to obtain first type candidate motion information, and add the first type candidate motion information to the motion information candidate list; perform mapping and calculation on a combination of two or three pieces of the motion information in the top-left corner, the motion information in the top-right corner, the motion information in the bottom-left corner of the current image block, and the temporal domain motion information, to obtain second type candidate motion information, and add the second type candidate motion information to the motion information candidate list.

As an implementation, when the prediction mode is an optional temporal motion vector prediction ATMVP merge mode, the checking order includes the traversal order for 1 spatial candidate block;

wherein the 1 spatial candidate block includes a second spatial candidate block.

As an implementation, the construction unit 1030 is configured to construct a sub-block technology based motion information candidate list based on the candidate motion information of the ATMVP merge mode and the affine merge mode and mark the modes of the pieces of candidate motion information.

As an implementation, the construction unit 1030 is configured to construct a sub-block technology based motion information candidate list based on the candidate motion information of the ATMVP merge mode and add the candidate motion information of the affine merge mode to the sub-block technology based motion information candidate list.

As an implementation, when the prediction mode is the merge mode, the checking order includes the traversal order for 4 spatial candidate blocks; or when the prediction mode is the IBC merge mode, the checking order includes the traversal order for 4 spatial candidate blocks; or when the prediction mode is the triangle prediction merge mode, the checking order includes the traversal order for 4 spatial candidate blocks; or when the prediction mode is an affine merge mode, the checking order includes the traversal order for 4 spatial candidate blocks;

wherein the 4 spatial candidate blocks include a first spatial candidate block, a second spatial candidate block, a third spatial candidate block, and a fourth spatial candidate block, wherein the first spatial candidate block is the lowermost spatial neighboring block on the left of the current image block; the second spatial candidate block is the rightmost spatial neighboring block on top of the current image block; the third spatial candidate block is the spatial neighboring block closest to the top-right corner of the current image block; the fourth spatial candidate block is the spatial neighboring block closest to the bottom-left corner of the current image block.

As an implementation, when the prediction mode is the merge mode, the traversal order for the 4 spatial candidate blocks is the first traversal order; or when the prediction mode is the IBC merge mode, the traversal order for the 4 spatial candidate blocks is the first traversal order; or when the prediction mode is the triangle prediction merge mode, the traversal order of the 4 spatial candidate blocks is the first traversal order; or when the prediction mode is the affine merge mode, the traversal order of the 4 spatial candidate blocks is a fourth traversal order, and the fourth traversal order is to sequentially traverse the third spatial candidate block, the second spatial candidate block, the fourth spatial candidate block and the first spatial candidate block.

As an implementation, when the prediction mode is the advanced motion vector prediction AMVP mode or the IBC AMVP mode, the checking order includes at least a fifth traversal order and a sixth traversal order; the fifth traversal order is used to traverse the spatial candidate blocks on top of the current image block, and the sixth traversal order is used to traverse the spatial candidate blocks on the left of the current image block; the spatial candidate blocks on the top include: the third spatial candidate block, the second spatial candidate block and the fifth spatial candidate block; the spatial candidate blocks on the left include: the fourth spatial candidate blocks and the first spatial candidate block;

the fifth traversal order is to sequentially traverse the third spatial candidate block, the second spatial candidate block, and the fifth spatial candidate block;

the sixth traversal order is to sequentially traverse the fourth spatial candidate block and the first spatial candidate block.

As an implementation, the second determination unit 1020 is specifically configured to first traverse the spatial candidate blocks on the top based on the fifth traversal order, and then traverse the spatial candidate blocks on the left based on the sixth traversal order, to determine the candidate motion information.

As an implementation, the second determination unit 1020 is specifically configured to, when the prediction mode is the AMVP mode, sequentially traverse the spatial candidate blocks on the top based on the fifth traversal order, to obtain one piece of usable motion information; or, when the motion information of the spatial candidate blocks on the top is available but none of the motion information of the spatial candidate blocks on the top is usable, traverse a scaled block corresponding to the third spatial candidate block, a scaled block corresponding to the second spatial candidate block, and a scaled block corresponding to the fifth spatial candidate block, to obtain one piece of usable motion information; or when none of the motion information of the spatial candidate blocks on the top is available, 0 piece of usable motion information is obtained.

As an implementation, the second determination unit 1020 is specifically configured to, when the prediction mode is the AMVP mode, sequentially traverse the spatial candidate blocks on the left based on the sixth traversal order, to obtain one piece of usable motion information or 0 piece of usable motion information;

wherein when the motion information of the spatial candidate blocks on the left is available, and none of the motion information of the spatial candidate block on the top is available, sequentially traverse the scaled block corresponding to the fourth spatial candidate block and the scaled block corresponding to first spatial candidate block, to obtain one piece of usable motion information.

As an implementation, the second determination unit 1020 is specifically configured to, when the prediction mode is the IBC AMVP mode, sequentially traverse the spatial candidate blocks on the top based on the fifth traversal order, to obtain one piece of motion information or 0 piece of usable motion information.

As an implementation, the second determination unit 1020 is specifically configured to, when the prediction mode is the IBC AMVP mode, sequentially traverse the spatial candidate blocks on the left based on the sixth traversal order, to obtain one piece of usable motion information or 0 piece of usable motion information.

As an implementation, when the prediction mode is the affine AMVP mode, the checking order is a third traversal order.

Figure 11:
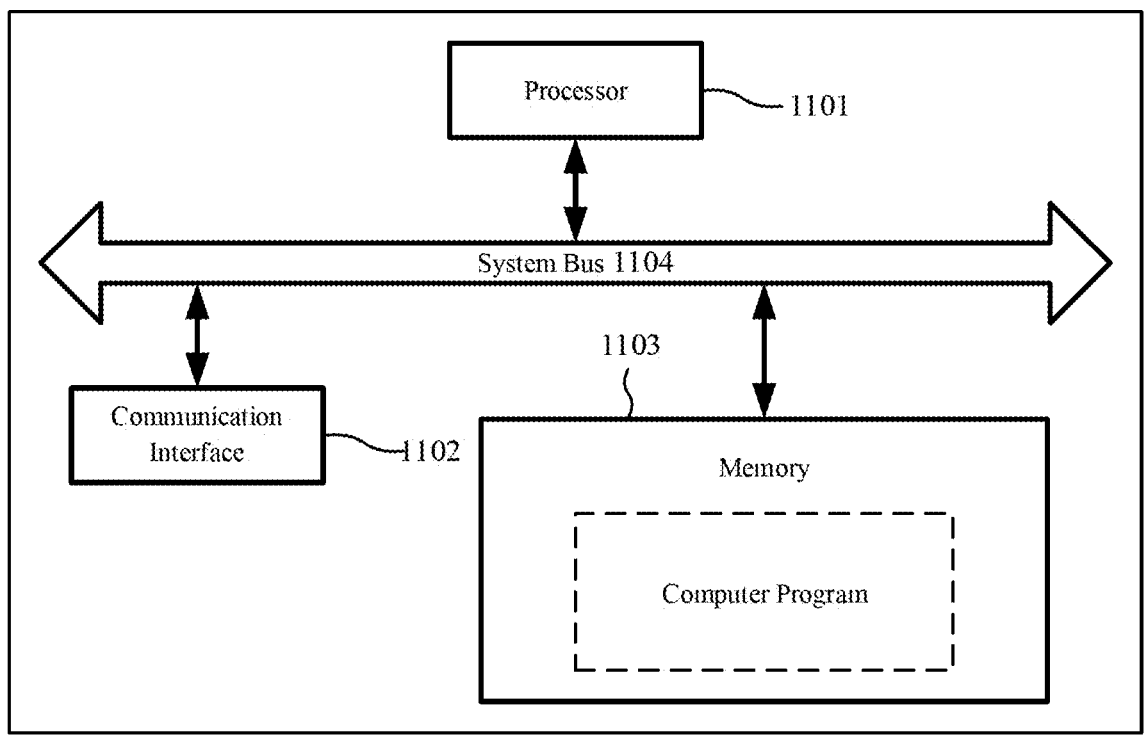
FIG. 11 is a schematic diagram of a hardware structure of an apparatus for triangle prediction decoding according to an example of the present disclosure.

Referring to FIG. 11, FIG. 11 is a schematic diagram of a hardware structure of an apparatus for triangle prediction decoding according to an example of the present disclosure. The apparatus for triangle prediction decoding can include a processor 1101, a communication interface 1102, a memory 1103, and a communication bus 1104. The processor 1101, the communication interface 1102, and the memory 1103 communicate with each other via the communication bus 1104. A computer program is stored in the memory 1103; the processor 1101 can implement the method for triangle prediction decoding by executing the program stored in the memory 1103.

The memory 1103 mentioned herein can be any electronic, magnetic, optical or other physical storage device, and can contain or store information, such as executable instructions, data, and so on. For example, the memory 1102 can be: a Random Access Memory (RAM), a volatile memory, a non-volatile memory, a flash memory, a storage drive (such as a hard drive), a solid state drive, and any type of storage disks (such as an optical disk, DVD, etc.), or similar storage media, or a combination thereof.

Figure 12:
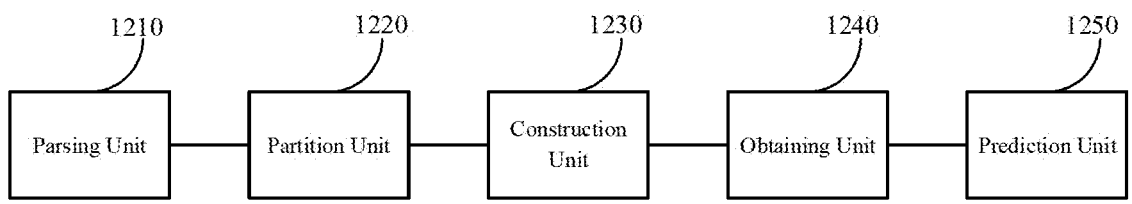
FIG. 12 is a schematic block diagram of an apparatus for triangle prediction decoding according to an example of the present disclosure.

As shown in FIG. 12, in terms of functions, the apparatus for triangle prediction decoding can include: a parsing unit 1210, a partition unit 1220, a construction unit 1230, an obtaining unit 1240, and a prediction unit 1250; wherein the parsing unit 1210 is configured to obtain partition information of the triangle sub-blocks of the current image block;

the parsing unit 1210 is further configured to obtain index values of motion information corresponding to the triangle sub-blocks of the current image block in a list;

the partition unit 1220 is configured to perform sub-block partitioning of the current image block based on the partition information;

the construction unit 1230 is configured to construct a motion information candidate list of the current image block; wherein for constructing a motion information candidate list, reference can be made to the related description in the method example shown in FIG. 6;

the obtaining unit 1240 is configured to obtain motion information corresponding to the triangle sub-blocks of the image block from the motion information candidate list based on the index values;

the prediction unit 1250 is configured to perform motion compensation on the triangle sub-blocks of the current image block and intermediate boundary sub-blocks thereof based on the motion information corresponding to the triangle sub-blocks of the image block to obtain the prediction motion information of the current image block.

Figure 13:
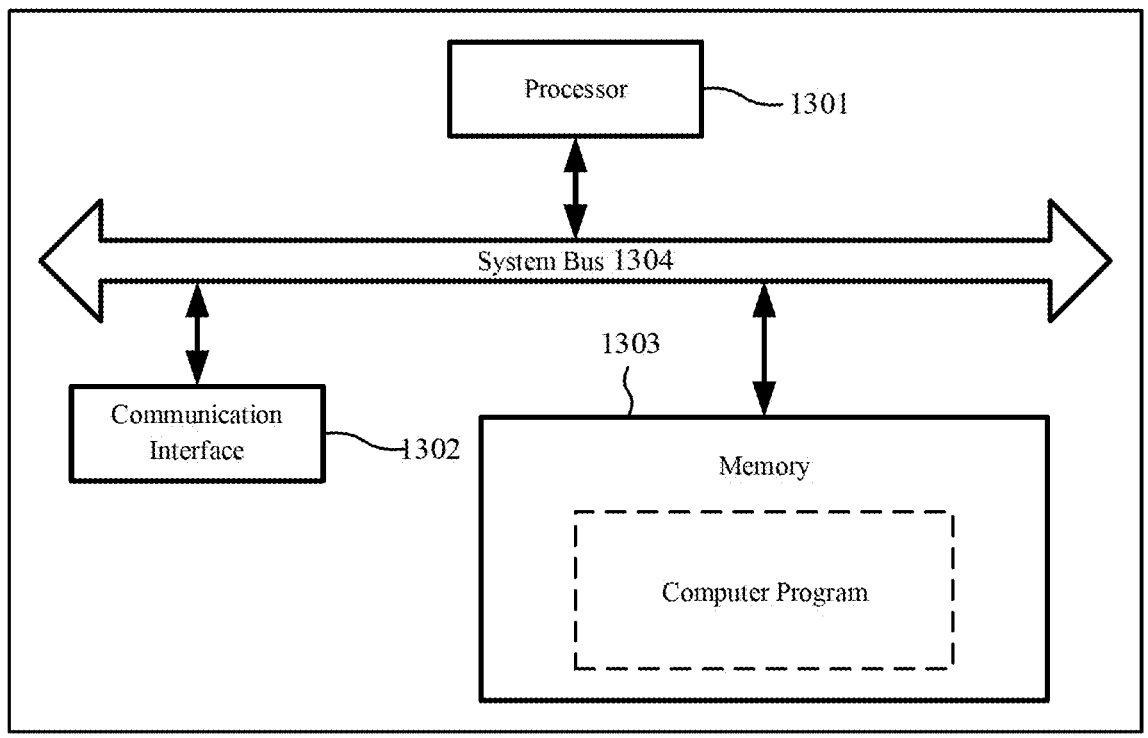
FIG. 13 is a schematic diagram of a hardware structure of an apparatus for coding/decoding indices according to an example of the present disclosure.

Referring to FIG. 13, FIG. 13 is a schematic diagram of a hardware structure of an apparatus for coding/decoding indices according to an example of the present disclosure. The apparatus for coding/decoding indices can include a processor 1301, a communication interface 1302, a memory 1303, and a communication bus 1304. The processor 1301, the communication interface 1302, and the memory 1303 communicate with each other via the communication bus 1304. A computer program is stored on the memory 1303; the processor 1301 can implement the method for coding/decoding indices described above by executing the program stored in the memory 1303.

The memory 1303 mentioned herein can be any electronic, magnetic, optical or other physical storage device, and can contain or store information, such as executable instructions, data, and so on. For example, the memory 1302 can be: a Random Access Memory (RAM), a volatile memory, a non-volatile memory, a flash memory, a storage drive (such as a hard drive), a solid state chive, and any type of storage disks (such as an optical disk, DVD, etc.), or similar storage media, or a combination thereof.

Figure 14:
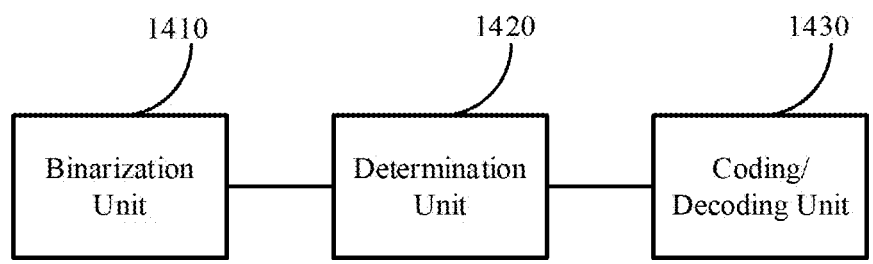
FIG. 14 is a schematic block diagram of an apparatus for coding/decoding indices according to an example of the present disclosure.

As shown in FIG. 14, in terms of functions, the apparatus for coding/decoding indices can include: a binarization unit 1410, a determination unit 1420, and an coding/decoding unit 1430; wherein the binarization unit 1410 is configured to binarize indices of modes of motion compensation candidates to obtain a binary code word sequence;

the determination unit 1420 is configured to determine a context model matching a shape of a current image block;

the coding/decoding unit 1430 is configured to code/decode a first binary code word in the binary code word sequence based on the context model.

Figure 15:
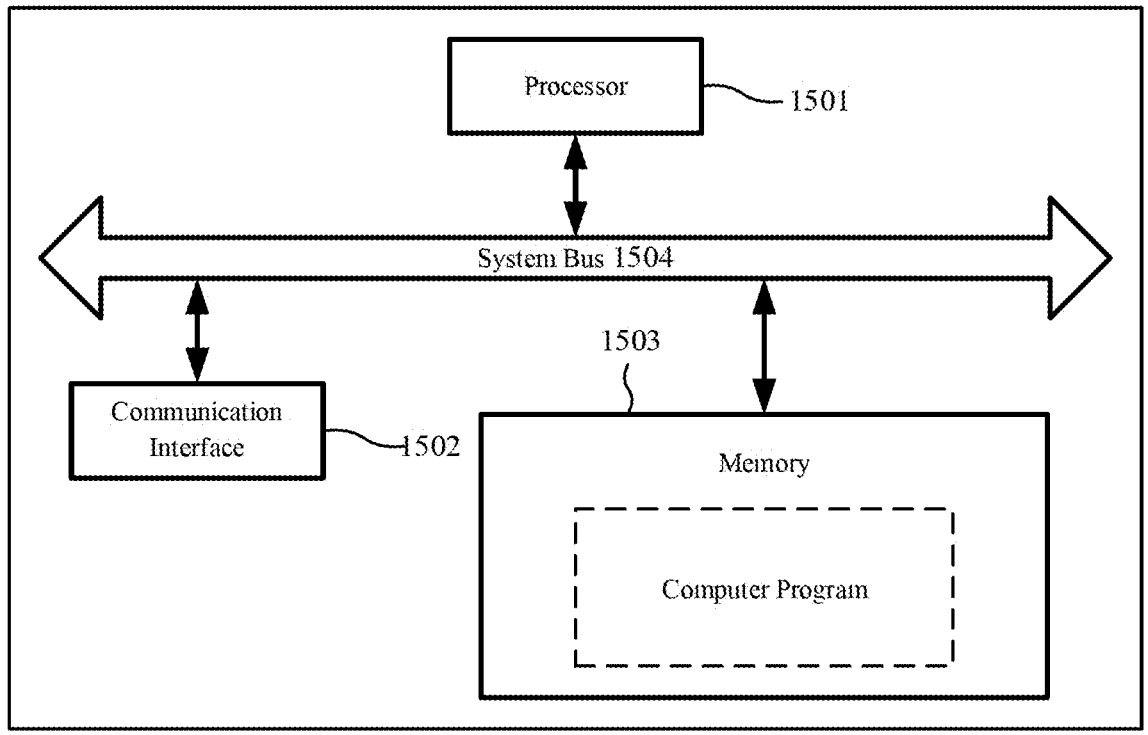
FIG. 15 is a schematic diagram of a hardware structure of an apparatus for coding/decoding indices according to an example of the present disclosure.

Referring to FIG. 15, FIG. 15 is a schematic diagram of a hardware structure of an apparatus for coding/decoding indices according to an example of the present disclosure. The apparatus for coding/decoding indices can include a processor 1501, a communication interface 1502, a memory 1503, and a communication bus 1504. The processor 1501, the communication interface 1502, and the memory 1503 communicate with each other via the communication bus 1504. A computer program is stored on the memory 1503;

the processor 1501 can implement the method for coding/decoding indices described above by executing the program stored on the memory 1503.

The memory 1503 mentioned herein can be any electronic, magnetic, optical or other physical storage device, and can contain or store information, such as executable instructions, data, and so on. For example, the memory 1502 can be: a Random Access Memory (RAM), a volatile memory, a non-volatile memory, a flash memory, a storage drive (such as a hard drive), a solid state drive, and any type of storage disks (such as an optical disk, DVD, etc.), or similar storage media, or a combination thereof.

Figure 16:
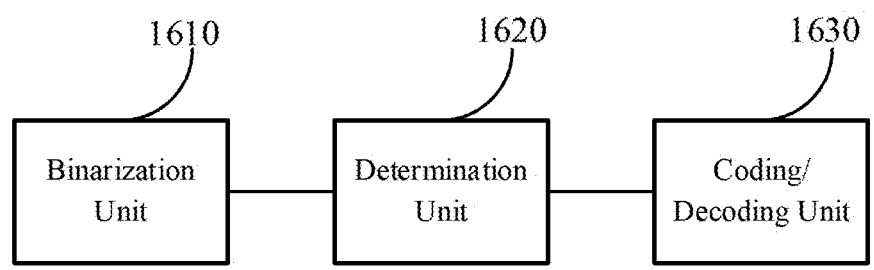
FIG. 16 is a schematic block diagram of an apparatus for coding/decoding indices according to an example of the present disclosure.

As shown in FIG. 16, in terms of functions, the apparatus for coding/decoding indices can include: a binarization unit 1610, a determination unit 1620, and an coding/decoding unit 1630; wherein the binarization unit 1610 is configured to binarize indices of modes of motion compensation candidates based on a shape of a current image block, to obtain a binary code word sequence;

the determination unit 1620 is configured to determine a context model;

the coding/decoding unit 1630 is configured to code/decode a first binary code word in the binary code word sequence based on the context model.

It should be noted that in the present disclosure, the relational terms such as first and second are only used to distinguish one entity or operation from another entity or operation, and do not necessarily require or imply there is any such actual relationship or sequence between these entities or operations. Moreover, the terms "comprise", "include" or any other variants thereof are intended to cover non-exclusive inclusion, so that a process, method, article or device including a series of elements not only includes such elements, but also includes other elements that are not explicitly listed, or also include elements inherent to this process, method, article or device. If there are no more restrictions, the element defined by the sentence "including a . . . " does not exclude the existence of other identical elements in the process, method, article, or device that includes the element.

The above descriptions are only preferred examples of the present disclosure, and are not intended to limit the present disclosure. Any modification, equivalent replacement, improvement, etc. made within the spirit and principle of the present disclosure shall fall within the scope of protection of the present disclosure.

What is claimed is:

1. A method for constructing a motion information candidate list, comprising:

determining a checking order for each of spatial candidate blocks of a current image block, wherein the checking order for the spatial candidate block on top of the current image block is prior to the checking order for the spatial candidate block on the left of the current image block;

acquiring available spatial candidate motion information based on the checking order; and constructing a motion information candidate list corresponding to the current image block based on the spatial candidate motion information;

wherein determining the checking order for each of the spatial candidate blocks of the current image block comprises:

determining a prediction mode for the current image block;

determining the checking order for each of the spatial candidate blocks of the current image block based on the prediction mode;

wherein determining the checking order for each of the spatial candidate blocks of the current image block based on the prediction mode comprises:

when the prediction mode is a merge mode, the checking order comprises a traversal order for 4 spatial candidate blocks, wherein the 4 spatial candidate blocks comprise a spatial candidate block B1, a spatial candidate block A1, a spatial candidate block B0 and a spatial candidate block A0, top two spatial candidate blocks in the 4 spatial candidate blocks which are traversed first are the spatial candidate block B1 and the spatial candidate block A1, and the checking order for the spatial candidate block B1 is prior to that for the spatial candidate block A1;

wherein the spatial candidate block A1 is a lowermost spatial neighboring block on the left of the current image block, the spatial candidate block B1 is a rightmost spatial neighboring block on top of the current image block, the spatial candidate block B0 is a spatial neighboring block closest to a top-right corner of the current image block, the spatial candidate block A0 is a spatial neighboring block closest to a bottom-left corner of the current image block.

2. The method of claim 1, wherein determining the checking order for each of the spatial candidate blocks of the current image block based on the prediction mode comprises:

when the prediction mode is a merge mode, the checking order comprises a traversal order for 5 spatial candidate blocks;

wherein the 5 spatial candidate blocks comprise a spatial candidate block B1, a spatial candidate block A1, a spatial candidate block B0, a spatial candidate A0, and a spare spatial candidate block B2, wherein top two spatial candidate blocks in the 5 spatial candidate blocks which are traversed first are a spatial candidate block B1 and a spatial candidate block A1, and the checking order for the spatial candidate block B1 is prior to that for the spatial candidate block A1, the traversal order for the spatial candidate block B1, the spatial candidate block A1, the spatial candidate block B0, and the spatial candidate block A0 is prior to that for the spare spatial candidate block B2, the spare spatial candidate block B2 is checked when spatial motion information of at least one of previous four spatial candidate blocks in the checking order is not available; the spare spatial candidate block B2 is a spatial neighboring block closest to a top-left corner of the current image block.

3. The method of claim 2, wherein when the prediction mode is a merge mode, constructing a motion information candidate list corresponding to the current image block, comprises:

checking each spatial candidate block of the current image block in the checking order to obtain available spatial candidate motion information, and adding the obtained spatial candidate motion information into the motion information candidate list;

determining temporal candidate motion information, and adding the determined temporal candidate motion information into the motion information candidate list;

if a number of pieces of candidate motion information in the motion information candidate list is insufficient, constructing a motion information list of coded/decoded blocks based on motion information of the coded/decoded blocks, and obtaining motion information from the motion information list of the coded/decoded blocks and adding the obtained motion information as candidate motion information into the motion information candidate list;

if a number of pieces of candidate motion information in the motion information candidate list is still insufficient, filling the motion information candidate list by one or more of the following ways:

first way: weighting pieces of motion information existing in the motion information candidate list, and adding motion information obtained by the weighting, as candidate motion information, to the motion information candidate list of the current image block;

second way: filling the motion information candidate list with default motion information.

4. The method of claim 3, wherein weighting pieces of motion information existing in the motion information candidate list, and adding motion information obtained by the weighting, as candidate motion information, to the motion information candidate list of the current image block, comprises:

obtaining top two pieces of candidate motion information in the motion information candidate list;

adding weighted candidate motion information obtained by weighting the top two pieces of candidate motion information to the motion information candidate list.

5. The method of claim 2, wherein when the prediction mode is an intra block copy, IBC, mode, constructing a motion information candidate list corresponding to the current image block, comprises:

checking each spatial candidate block of the current image block in the checking order to obtain available spatial candidate motion information, and adding the obtained spatial candidate motion information into the motion information candidate list;

if a number of pieces of candidate motion information in the motion information candidate list is insufficient, constructing a motion information list of coded/decoded blocks based on motion information of the coded/decoded blocks, and obtaining motion information from the motion information list of the coded/decoded blocks and adding the obtained motion information as candidate motion information into the motion information candidate list; and/or if a number of pieces of candidate motion information in the motion information candidate list is still insufficient, filling the motion information candidate list with default motion information.

6. A decoder, comprising a processor, a communication interface, a memory and a communication bus, wherein the processor, the communication interface and the memory communicate with each other via the communication bus;

the memory is configured to store a computer program;

the processor is configured to execute the computer program in the memory to perform operations comprising:

determining a checking order for each of spatial candidate blocks of a current image block, wherein the checking order for the spatial candidate block on top of the current image block is prior to the checking order for the spatial candidate block on the left of the current image block;

acquiring available spatial candidate motion information based on the checking order; and constructing a motion information candidate list corresponding to the current image block based on the spatial candidate motion information;

wherein determining the checking order for each of the spatial candidate blocks of the current image block comprises:

determining a prediction mode for the current image block;

determining the checking order for each of the spatial candidate blocks of the current image block based on the prediction mode;

wherein determining the checking order for each of the spatial candidate blocks of the current image block based on the prediction mode comprises:

when the prediction mode is a merge mode, the checking order comprises a traversal order for 4 spatial candidate blocks, wherein the 4 spatial candidate blocks comprise a spatial candidate block B1, a spatial candidate block A1, a spatial candidate block B0 and a spatial candidate block A0, top two spatial candidate blocks in the 4 spatial candidate blocks which are traversed first are the spatial candidate block B1 and the spatial candidate block A1, and the checking order for the spatial candidate block B1 is prior to that for the spatial candidate block A1;

wherein the spatial candidate block A1 is a lowermost spatial neighboring block on the left of the current image block, the spatial candidate block B1 is a rightmost spatial neighboring block on top of the current image block, the spatial candidate block B0 is a spatial neighboring block closest to a top-right corner of the current image block, the spatial candidate block A0 is a spatial neighboring block closest to a bottom-left corner of the current image block.

7. The decoder of claim 6, wherein determining the checking order for each of the spatial candidate blocks of the current image block based on the prediction mode comprises:

when the prediction mode is a merge mode, the checking order comprises a traversal order for 5 spatial candidate blocks;

wherein the 5 spatial candidate blocks comprise a spatial candidate block B1, a spatial candidate block A1, a spatial candidate block B0, a spatial candidate block A0, and a spare spatial candidate block B2, wherein top two spatial candidate blocks in the 5 spatial candidate blocks which are traversed first are a spatial candidate block B1 and a spatial candidate block A1, and the checking order for the spatial candidate block B1 is prior to that for the spatial candidate block A1, the traversal order for the spatial candidate block B1, the spatial candidate block A1, the spatial candidate block B0, and the spatial candidate block A0 is prior to that for the spare spatial candidate block B2, the spare spatial candidate block B2 is checked when spatial motion information of at least one of previous four spatial candidate blocks in the checking order is not available; the spare spatial candidate block B2 is a spatial neighboring block closest to a top-left corner of the current image block.

8. The decoder of claim 7, wherein when the prediction mode is a merge mode, constructing a motion information candidate list corresponding to the current image block, comprises:

checking each spatial candidate block of the current image block in the checking order to obtain available spatial candidate motion information, and adding the obtained spatial candidate motion information into the motion information candidate list;

determining temporal candidate motion information, and adding the determined temporal candidate motion information into the motion information candidate list;

if a number of pieces of candidate motion information in the motion information candidate list is insufficient, constructing a motion information list of coded/decoded blocks based on motion information of the coded/decoded blocks, and obtaining motion information from the motion information list of the coded/decoded blocks and adding the obtained motion information as candidate motion information into the motion information candidate list;

if a number of pieces of candidate motion information in the motion information candidate list is still insufficient, filling the motion information candidate list by one or more of the following ways:

first way: weighting pieces of motion information existing in the motion information candidate list, and adding motion information obtained by the weighting, as candidate motion information, to the motion information candidate list of the current image block;

second way: filling the motion information candidate list with default motion information.

9. The decoder of claim 8, wherein weighting pieces of motion information existing in the motion information candidate list, and adding motion information obtained by the weighting, as candidate motion information, to the motion information candidate list of the current image block, comprises:

obtaining top two pieces of candidate motion information in the motion information candidate list;

adding weighted candidate motion information obtained by weighting the top two pieces of candidate motion information to the motion information candidate list.

10. The decoder of claim 7, wherein when the prediction mode is an intra block copy, IBC, mode, constructing a motion information candidate list corresponding to the current image block, comprises:

checking each spatial candidate block of the current image block in the checking order to obtain available spatial candidate motion information, and adding the obtained spatial candidate motion information into the motion information candidate list;

if a number of pieces of candidate motion information in the motion information candidate list is insufficient, constructing a motion information list of coded/decoded blocks based on motion information of the coded/decoded blocks, and obtaining motion information from the motion information list of the coded/decoded blocks and adding the obtained motion information as candidate motion information into the motion information candidate list; and/or if a number of pieces of candidate motion information in the motion information candidate list is still insufficient, filling the motion information candidate list with default motion information.

11. An encoder, comprising a processor, a communication interface, a memory and a communication bus, wherein the processor, the communication interface and the memory communicate with each other via the communication bus;

the memory is configured to store a computer program;

the processor is configured to execute the computer program in the memory to perform operations comprising:

determining a checking order for each of spatial candidate blocks of a current image block, wherein the checking order for the spatial candidate block on top of the current image block is prior to the checking order for the spatial candidate block on the left of the current image block;

acquiring available spatial candidate motion information based on the checking order; and constructing a motion information candidate list corresponding to the current image block based on the spatial candidate motion information;

wherein determining the checking order for each of the spatial candidate blocks of the current image block comprises:

determining a prediction mode for the current image block;

determining the checking order for each of the spatial candidate blocks of the current image block based on the prediction mode;

wherein determining the checking order for each of the spatial candidate blocks of the current image block based on the prediction mode comprises:

when the prediction mode is a merge mode, the checking order comprises a traversal order for 4 spatial candidate blocks, wherein the 4 spatial candidate blocks comprise a spatial candidate block B1, a spatial candidate block A1, a spatial candidate block B0 and a spatial candidate block A0, top two spatial candidate blocks in the 4 spatial candidate blocks which are traversed first are the spatial candidate block B1 and the spatial candidate block A1, and the checking order for the spatial candidate block B1 is prior to that for the spatial candidate block A1;

wherein the spatial candidate block A1 is a lowermost spatial neighboring block on the left of the current image block, the spatial candidate block B1 is a rightmost spatial neighboring block on top of the current image block, the spatial candidate block B0 is a spatial neighboring block closest to a top-right corner of the current image block, the spatial candidate block A0 is a spatial neighboring block closest to a bottom-left corner of the current image block.

12. The encoder of claim 11, wherein determining the checking order for each of the spatial candidate blocks of the current image block based on the prediction mode comprises:

when the prediction mode is a merge mode, the checking order comprises a traversal order for 5 spatial candidate blocks;

wherein the 5 spatial candidate blocks comprise a spatial candidate block B1, a spatial candidate block A1, a spatial candidate block B0, a spatial candidate block A0, and a spare spatial candidate block B2, wherein top two spatial candidate blocks in the 5 spatial candidate blocks which are traversed first are a spatial candidate block B1 and a spatial candidate block A1, and the checking order for the spatial candidate block B1 is prior to that for the spatial candidate block A1, the traversal order for the spatial candidate block B1, the spatial candidate block A1, the spatial candidate block B0, and the spatial candidate block A0 is prior to that for the spare spatial candidate block B2, the spare spatial candidate block B2 is checked when spatial motion information of at least one of previous four spatial candidate blocks in the checking order is not available; the spare spatial candidate block B2 is a spatial neighboring block closest to a top-left corner of the current image block.

13. The encoder of claim 12, wherein when the prediction mode is a merge mode, constructing a motion information candidate list corresponding to the current image block, comprises:

checking each spatial candidate block of the current image block in the checking order to obtain available spatial candidate motion information, and adding the obtained spatial candidate motion information into the motion information candidate list;

determining temporal candidate motion information, and adding the determined temporal candidate motion information into the motion information candidate list;

if a number of pieces of candidate motion information in the motion information candidate list is insufficient, constructing a motion information list of coded/decoded blocks based on motion information of the coded/decoded blocks, and obtaining motion information from the motion information list of the coded/decoded blocks and adding the obtained motion information as candidate motion information into the motion information candidate list;

if a number of pieces of candidate motion information in the motion information candidate list is still insufficient, filling the motion information candidate list by one or more of the following ways:

first way: weighting pieces of motion information existing in the motion information candidate list, and adding motion information obtained by the weighting, as candidate motion information, to the motion information candidate list of the current image block;

second way: filling the motion information candidate list with default motion information.

14. The encoder of claim 13, wherein weighting pieces of motion information existing in the motion information candidate list, and adding motion information obtained by the weighting, as candidate motion information, to the motion information candidate list of the current image block, comprises:

obtaining top two pieces of candidate motion information in the motion information candidate list;

adding weighted candidate motion information obtained by weighting the top two pieces of candidate motion information to the motion information candidate list.

15. The encoder of claim 12, wherein when the prediction mode is an intra block copy, IBC, mode, constructing a motion information candidate list corresponding to the current image block, comprises:

checking each spatial candidate block of the current image block in the checking order to obtain available spatial candidate motion information, and adding the obtained spatial candidate motion information into the motion information candidate list;

if a number of pieces of candidate motion information in the motion information candidate list is insufficient, constructing a motion information list of coded/decoded blocks based on motion information of the coded/decoded blocks, and obtaining motion information from the motion information list of the coded/decoded blocks and adding the obtained motion information as candidate motion information into the motion information candidate list; and/or if a number of pieces of candidate motion information in the motion information candidate list is still insufficient, filling the motion information candidate list with default motion information.

16. A non-transitory storage medium storing machine-executable instructions executable by a processor, and when the machine-executable instructions are executed by the processor, the processor performs operations comprising:

determining a checking order for each of spatial candidate blocks of a current image block, wherein the checking order for the spatial candidate block on top of the current image block is prior to the checking order for the spatial candidate block on the left of the current image block;

acquiring available spatial candidate motion information based on the checking order; and constructing a motion information candidate list corresponding to the current image block based on the spatial candidate motion information;

wherein determining the checking order for each of the spatial candidate blocks of the current image block comprises:

determining a prediction mode for the current image block;

determining the checking order for each of the spatial candidate blocks of the current image block based on the prediction mode;

wherein determining the checking order for each of the spatial candidate blocks of the current image block based on the prediction mode comprises:

when the prediction mode is a merge mode, the checking order comprises a traversal order for 4 spatial candidate blocks, wherein the 4 spatial candidate blocks comprise a spatial candidate block B1, a spatial candidate block A1, a spatial candidate block B0 and a spatial candidate block A0, top two spatial candidate blocks in the 4 spatial candidate blocks which are traversed first are the spatial candidate block B1 and the spatial candidate block A1, and the checking order for the spatial candidate block B1 is prior to that for the spatial candidate block A1;

wherein the spatial candidate block A1 is a lowermost spatial neighboring block on the left of the current image block, the spatial candidate block B1 is a rightmost spatial neighboring block on top of the current image block, the spatial candidate block B0 is a spatial neighboring block closest to a top-right corner of the current image block, the spatial candidate block A0 is a spatial neighboring block closest to a bottom-left corner of the current image block.

17. The non-transitory storage medium of claim 16, wherein determining the checking order for each of the spatial candidate blocks of the current image block based on the prediction mode comprises:

when the prediction mode is a merge mode, the checking order comprises a traversal order for 5 spatial candidate blocks;

wherein the 5 spatial candidate blocks comprise a spatial candidate block B1, a spatial candidate block A1, a spatial candidate block B0, a spatial candidate block A0, and a spare spatial candidate block B2, wherein top two spatial candidate blocks in the 5 spatial candidate blocks which are traversed first are a spatial candidate block B1 and a spatial candidate block A1, and the checking order for the spatial candidate block B1 is prior to that for the spatial candidate block A1, the traversal order for the spatial candidate block B1, the spatial candidate block A1, the spatial candidate block B0, and the spatial candidate block A0 is prior to that for the spare spatial candidate block B2, the spare spatial candidate block B2 is checked when spatial motion information of at least one of previous four spatial candidate blocks in the checking order is not available; the spare spatial candidate block B2 is a spatial neighboring block closest to a top-left corner of the current image block.

18. The non-transitory storage medium of claim 17, wherein when the prediction mode is a merge mode, constructing a motion information candidate list corresponding to the current image block, comprises:
checking each spatial candidate block of the current image block in the checking order to obtain available spatial candidate motion information, and adding the obtained spatial candidate motion information into the motion information candidate list;
determining temporal candidate motion information, and adding the determined temporal candidate motion information into the motion information candidate list;
if a number of pieces of candidate motion information in the motion information candidate list is insufficient, constructing a motion information list of coded/decoded blocks based on motion information of the coded/decoded blocks, and obtaining motion information from the motion information list of the coded/decoded blocks and adding the obtained motion information as candidate motion information into the motion information candidate list;
if a number of pieces of candidate motion information in the motion information candidate list is still insufficient, filling the motion information candidate list by one or more of the following ways:
first way: weighting pieces of motion information existing in the motion information candidate list, and adding motion information obtained by the weighting, as candidate motion information, to the motion information candidate list of the current image block;
second way: filling the motion information candidate list with default motion information.

19. The non-transitory storage medium of claim 18, wherein weighting pieces of motion information existing in the motion information candidate list, and adding motion information obtained by the weighting, as candidate motion information, to the motion information candidate list of the current image block, comprises:
obtaining top two pieces of candidate motion information in the motion information candidate list;
adding weighted candidate motion information obtained by weighting the top two pieces of candidate motion information to the motion information candidate list.

20. The non-transitory storage medium of claim 17, wherein when the prediction mode is an intra block copy, IBC, mode, constructing a motion information candidate list corresponding to the current image block, comprises:
checking each spatial candidate block of the current image block in the checking order to obtain available spatial candidate motion information, and adding the obtained spatial candidate motion information into the motion information candidate list;
if a number of pieces of candidate motion information in the motion information candidate list is insufficient, constructing a motion information list of coded/decoded blocks based on motion information of the coded/decoded blocks, and obtaining motion information from the motion information list of the coded/decoded blocks and adding the obtained motion information as candidate motion information into the motion information candidate list; and/or
if a number of pieces of candidate motion information in the motion information candidate list is still insufficient, filling the motion information candidate list with default motion information.

* * * * *